US008190741B2

(12) United States Patent
Wong et al.

(10) Patent No.: US 8,190,741 B2
(45) Date of Patent: May 29, 2012

(54) CUSTOMIZING A NAMESPACE IN A DECENTRALIZED STORAGE ENVIRONMENT

(75) Inventors: Thomas K. Wong, Pleasanton, CA (US); Anand Iyengar, Mountain View, CA (US); Panagiotis Tsirigotis, Sunnyvale, CA (US); Chi Ming Wong, San Francisco, CA (US); Yu Cheong Chan, Mountain View, CA (US); Richard A. Simpkins, Mountain View, CA (US)

(73) Assignee: Neopath Networks, Inc., Mountain View, CA (US)

( * ) Notice: Subject to any disclaimer, the term of this patent is extended or adjusted under 35 U.S.C. 154(b) by 1224 days.

(21) Appl. No.: 11/395,118

(22) Filed: Mar. 31, 2006

(65) Prior Publication Data

US 2006/0271598 A1 Nov. 30, 2006

Related U.S. Application Data

(63) Continuation-in-part of application No. 10/831,376, filed on Apr. 23, 2004, now Pat. No. 7,346,664.

(51) Int. Cl.
G06F 15/173 (2006.01)
(52) U.S. Cl. ........................................ 709/226
(58) Field of Classification Search .................. 709/229, 709/231, 226; 717/100, 154, 200; 707/200
See application file for complete search history.

(56) References Cited

U.S. PATENT DOCUMENTS

| 5,465,335 A | 11/1995 | Anderson |
| 5,689,701 A | 11/1997 | Ault et al. |
| 5,774,715 A | 6/1998 | Madany et al. |
| 5,832,261 A | 11/1998 | Ishizaka et al. |
| 5,890,169 A | 3/1999 | Wong et al. |
| 5,933,825 A | 8/1999 | McClaughry et al. |
| 5,951,656 A | 9/1999 | Finnell |
| 6,070,254 A | 5/2000 | Pratt et al. |
| 6,101,508 A | 8/2000 | Wolff |
| 6,192,408 B1 | 2/2001 | Vahalia et al. |
| 6,314,460 B1 | 11/2001 | Knight et al. |
| 6,341,302 B1 | 1/2002 | Celis |
| 6,353,837 B1 | 3/2002 | Blumenau |
| 6,389,427 B1 | 5/2002 | Faulkner |

(Continued)

FOREIGN PATENT DOCUMENTS

EP 0 108 338 A2 5/1984

(Continued)

OTHER PUBLICATIONS

U.S. Appl. No. 60/478,154, filed Apr. 24, 2003.

(Continued)

*Primary Examiner* — Brian P Whipple
(74) *Attorney, Agent, or Firm* — Weaver Austin Villeneuve and Sampson LLP

(57) ABSTRACT

Systems and methods to customize a namespace using a synthetic namespace. A NAS switch provides file migrations in a NAS storage network that are transparent to the clients. The NAS switch file handles are used to customize a namespace. More specifically, a synthetic namespace is generated from one or more file location tables that map the switch file handles to NAS file handles. The NAS file handles are independent of a physical export containing the objects referred to by the NAS file handles. In one example, the synthetic namespace presents a home directory corresponding to a location of a user.

19 Claims, 13 Drawing Sheets

U.S. PATENT DOCUMENTS

| | | |
|---|---|---|
| 6,408,298 B1 | 6/2002 | Van et al. |
| 6,442,548 B1 | 8/2002 | Balabine et al. |
| 6,453,354 B1 | 9/2002 | Jiang et al. |
| 6,473,401 B1 | 10/2002 | Kong et al. |
| 6,606,690 B2 | 8/2003 | Padovano |
| 6,615,365 B1 | 9/2003 | Jenevein et al. |
| 6,633,887 B2 | 10/2003 | Suzuki et al. |
| 6,694,431 B1 | 2/2004 | Binding et al. |
| 6,697,846 B1 | 2/2004 | Soltis |
| 6,711,625 B1 | 3/2004 | Simpson |
| 6,738,883 B2 | 5/2004 | March et al. |
| 6,931,410 B2 | 8/2005 | Anderson et al. |
| 6,938,039 B1 | 8/2005 | Bober et al. |
| 6,983,379 B1 | 1/2006 | Spalink et al. |
| 6,985,956 B2 | 1/2006 | Luke et al. |
| 6,996,714 B1 | 2/2006 | Halasz et al. |
| 7,054,927 B2 | 5/2006 | Ulrich et al. |
| 7,072,917 B2 | 7/2006 | Wong et al. |
| 7,089,293 B2 | 8/2006 | Grosner et al. |
| 7,092,976 B2 | 8/2006 | Curran et al. |
| 7,096,253 B2 | 8/2006 | Vinson et al. |
| 7,103,628 B2 | 9/2006 | Neiman et al. |
| 7,120,666 B2 | 10/2006 | McCanne et al. |
| 7,127,477 B2 | 10/2006 | Duncombe et al. |
| 7,254,636 B1 | 8/2007 | O'Toole et al. |
| 7,272,613 B2 | 9/2007 | Sim et al. |
| 7,272,654 B1* | 9/2007 | Brendel ............... 709/229 |
| 7,308,473 B1* | 12/2007 | Thomas et al. ......... 709/203 |
| 7,308,709 B1 | 12/2007 | Brezak et al. |
| 7,313,579 B2 | 12/2007 | Murotani |
| 7,324,995 B2 | 1/2008 | Findleton et al. |
| 7,346,664 B2 | 3/2008 | Wong et al. |
| 7,386,610 B1 | 6/2008 | Vekiarides |
| 7,441,011 B2 | 10/2008 | Lin et al. |
| 7,475,142 B2 | 1/2009 | Sharma et al. |
| 7,512,673 B2 | 3/2009 | Miloushev et al. |
| 7,562,110 B2 | 7/2009 | Miloushev et al. |
| 7,587,422 B2 | 9/2009 | Wong et al. |
| 7,587,471 B2 | 9/2009 | Yasuda et al. |
| 7,720,796 B2 | 5/2010 | Wong et al. |
| 7,831,641 B2 | 11/2010 | Wong et al. |
| 7,844,646 B1 | 11/2010 | Deshmukh et al. |
| 2002/0013832 A1 | 1/2002 | Hubbard |
| 2002/0111929 A1 | 8/2002 | Pudipeddi et al. |
| 2002/0120763 A1 | 8/2002 | Miloushev et al. |
| 2002/0133491 A1 | 9/2002 | Sim et al. |
| 2002/0154645 A1 | 10/2002 | Hu et al. |
| 2002/0161855 A1 | 10/2002 | Manczak et al. |
| 2002/0184244 A1 | 12/2002 | Hsiao et al. |
| 2002/0199060 A1 | 12/2002 | Peters et al. |
| 2003/0037061 A1 | 2/2003 | Sastri et al. |
| 2003/0046270 A1 | 3/2003 | Leung et al. |
| 2003/0046335 A1 | 3/2003 | Doyle et al. |
| 2003/0056112 A1 | 3/2003 | Vinson et al. |
| 2003/0110263 A1 | 6/2003 | Shillo |
| 2003/0120948 A1* | 6/2003 | Schmidt et al. ......... 713/200 |
| 2003/0126247 A1 | 7/2003 | Strasser et al. |
| 2003/0140051 A1 | 7/2003 | Fujiwara et al. |
| 2003/0154236 A1 | 8/2003 | Dar et al. |
| 2003/0177178 A1 | 9/2003 | Jones et al. |
| 2003/0182313 A1 | 9/2003 | Federwisch et al. |
| 2003/0195903 A1 | 10/2003 | Manley et al. |
| 2003/0204613 A1 | 10/2003 | Hudson et al. |
| 2003/0204670 A1 | 10/2003 | Holt et al. |
| 2003/0220899 A1 | 11/2003 | Numanoi et al. |
| 2003/0220985 A1 | 11/2003 | Kawamoto et al. |
| 2004/0010714 A1 | 1/2004 | Stewart |
| 2004/0024963 A1 | 2/2004 | Talagala et al. |
| 2004/0054748 A1 | 3/2004 | Ackaouy et al. |
| 2004/0078465 A1 | 4/2004 | Coates et al. |
| 2004/0088297 A1 | 5/2004 | Coates et al. |
| 2004/0103104 A1 | 5/2004 | Hara et al. |
| 2004/0117438 A1 | 6/2004 | Considine et al. |
| 2004/0133577 A1 | 7/2004 | Miloushev et al. |
| 2004/0133606 A1* | 7/2004 | Miloushev et al. ......... 707/200 |
| 2004/0133650 A1 | 7/2004 | Miloushev et al. |
| 2004/0133652 A1 | 7/2004 | Miloushev et al. |
| 2004/0139167 A1 | 7/2004 | Edsall et al. |
| 2004/0153481 A1 | 8/2004 | Talluri |
| 2004/0186849 A1 | 9/2004 | Enko et al. |
| 2004/0267752 A1 | 12/2004 | Wong et al. |
| 2004/0267831 A1 | 12/2004 | Wong et al. |
| 2005/0033932 A1 | 2/2005 | Pudipeddi et al. |
| 2005/0055402 A1 | 3/2005 | Sato |
| 2005/0080981 A1 | 4/2005 | Archambault et al. |
| 2005/0125503 A1 | 6/2005 | Iyengar |
| 2005/0188211 A1 | 8/2005 | Scott et al. |
| 2005/0198062 A1 | 9/2005 | Shapiro |
| 2005/0262102 A1 | 11/2005 | Anderson et al. |
| 2006/0080371 A1 | 4/2006 | Wong et al. |
| 2006/0129627 A1 | 6/2006 | Phillips et al. |
| 2006/0161746 A1 | 7/2006 | Wong et al. |
| 2006/0253501 A1 | 11/2006 | Langan et al. |
| 2007/0024919 A1 | 2/2007 | Wong et al. |
| 2007/0074207 A1 | 3/2007 | Bates et al. |
| 2007/0136308 A1 | 6/2007 | Tsirigotis et al. |
| 2008/0114854 A1 | 5/2008 | Wong et al. |

FOREIGN PATENT DOCUMENTS

| | | |
|---|---|---|
| EP | 0 926 585 | 6/1999 |
| EP | 1 209 556 | 5/2002 |
| EP | 1 311 122 A2 | 5/2003 |
| EP | 1 396 789 A2 | 3/2004 |
| JP | HEI 04-299747 | 10/1992 |
| JP | HEI 10-247155 | 9/1998 |
| JP | 2001-075843 | 3/2001 |
| JP | 2004-054607 | 2/2004 |
| JP | 2004-110290 | 4/2004 |
| JP | 2005-502096 | 1/2005 |
| WO | 2004/097686 | 4/2004 |
| WO | WO 2004/053677 | 6/2004 |
| WO | 2004/097571 | 11/2004 |
| WO | 2004/097572 | 11/2004 |
| WO | 2004/097624 | 11/2004 |
| WO | 2005/029251 | 3/2005 |
| WO | 2006/039689 | 4/2006 |
| WO | 2006/080371 | 8/2006 |
| WO | 2007/002855 | 1/2007 |
| WO | 2007/041456 | 4/2007 |

OTHER PUBLICATIONS

Office Action mailed Jan. 3, 2007 for U.S. Appl. No. 10/832,785.
Final Office Action mailed Aug. 31, 2007 for U.S. Appl. No. 10/832,785.
Office Action, U.S. Appl. No. 10/832,785, mailed May 28, 2008.
Final Office Action mailed Jan. 5, 2009 for U.S. Appl. No. 10/832,785.
Office Action, U.S. Appl. No. 10/832,785, mailed Jun. 8, 2009.
U.S. Appl. No. 60/465,578, filed Apr. 24, 2003.
Office Action mailed Dec. 18, 2006 for U.S. Appl. No. 10/831,701.
Final Office Action mailed Sep. 12, 2007, for U.S. Appl. No. 10/831,701.
Office Action, U.S. Appl. No. 10/831,701, mailed Jun. 25, 2008.
Final Office Action, U.S. Appl. No. 10/831,701, mailed Jan. 5, 2009.
Notice of Allowance, U.S. Appl. No. 10/831,701, mailed May 14, 2009.
Allowed Claims, U.S. Appl. No. 10/831,701.
Office Action mailed Jan. 11, 2008, for U.S. Appl. No. 11/324,845.
Final Office Action, U.S. Appl. No. 11/324,845, mailed Sep. 5, 2008.
Office Action mailed Feb. 9, 2009, for U.S. Appl. No. 11/324,845.
U.S. Appl. No. 60/465,579, filed Apr. 24, 2003.
Office Action mailed Mar. 23, 2007, for U.S. Appl. No. 10/831,376.
Final Office Action mailed Aug. 10, 2007, for U.S. Appl. No. 10/831,376.
Notice of Allowance mailed Oct. 22, 2007, for U.S. Appl. No. 10/831,376.
Allowed Claims, U.S. Appl. No. 10/831,376.
Office Action, U.S. Appl. No. 11/241,554, mailed Aug. 8, 2007.
Final Office Action, U.S. Appl. No. 11/241,554, mailed Jul. 25, 2008.
Office Action, U.S. Appl. No. 11/241,554, mailed Jan. 8, 2009.
Final Office Action, U.S. Appl. No. 11/241,554, mailed Aug. 19, 2009.
U.S. Appl. No. 60/465,580, filed Apr. 24, 2003.

Office Action mailed Feb. 3, 2005 for U.S. Appl. No. 10/832,927.
Office Action mailed Jun. 22, 2005 for U.S. Appl. No. 10/832,927.
Notice of Allowance mailed Feb. 9, 2006 for U.S. Appl. No. 10/832,927.
Allowed Claims, U.S. Appl. No. 10/832,927.
U.S. Appl. No. 60/503,190, filed Sep. 15, 2003.
Non-Final Office Action dated Jan. 8, 2009 for U.S. Appl. No. 10/942,762.
Final Office Action dated Jul. 21, 2009 for U.S. Appl. No. 10/942,762.
U.S. Appl. No. 60/615,002, filed Sep. 30, 2004.
U.S. Appl. No. 60/641,217, filed Dec. 31, 2004.
International Preliminary Report on Patentability dated Apr. 10, 2008 for PCT Application No. PCT/US2006/038361.
International Search Report sent Sep. 30, 2008 for PCT Application No. PCT/US05/35624.
Written Opinion sent Sep. 30, 2008 for PCT Application No. PCT/US05/35624.
International Search Report mailed May 8, 2007 for PCT Application No. US/2006/25430.
Written Opinion mailed May 8, 2007 for PCT Application No. US/2006/25430.
European Search Report dated Dec. 14, 2008 for EP Patent Application No. 04750678.7.
European Office Action dated Apr. 9, 2009 for EP Patent Application No. 04750678.7.
Yamakawa et al., "NAS Switch: Virtualized Integration Techniques of NFS Server", Engineering Research Report of Institute of Electronics, Information and Communication Engineers published by Institute of Electronics, Information and Communication Engineers, Japan, Aug. 12, 2002, vol. 102, No. 275, pp. 13-18. Japan.
Notice of Allowance with Examiner Interview and Amendment dated Dec. 29, 2009 for U.S. Appl. No. 10/832,785.
Notice of Allowance with Examiner Interview and Amendment dated Apr. 21, 2010 for U.S. Appl. No. 10/832,785.
Notice of Allowance mailed Sep. 21, 2009, for U.S. Appl. No. 11/324,845.
Notice of Allowance mailed Dec. 2, 2009, for U.S. Appl. No. 11/324,845.
Notice of Allowance mailed Mar. 16, 2010, for U.S. Appl. No. 11/324,845.
Examiner Interview , U.S. Appl. No. 11/241,554, mailed Sep. 30, 2009.
Office Action, U.S. Appl. No. 11/241,554, mailed Feb. 5, 2010.
Office Action, U.S. Appl. No. 11/537,997, mailed Sep. 25, 2009.
Office Action U.S. Appl. No. 11/537,997, dated Apr. 15, 2010.
Non-Final Office Action dated Jan. 15, 2010 for U.S. Appl. No. 10/942,762.
International Preliminary Report on Patentability dated Mar. 5, 2009, PCT Application No. PCT/US2005/035624.
European Office Action dated Feb. 22, 2010 for EP Patent Application No. 04750678.7.
Chinese Office Action dated Nov. 20, 2009 for CN Patent Application No. 200680032142.X.
Japanese Office Action dated Dec. 22, 2009 for JP Patent Application No. 2006-513342.
Anderson, D.C. et al., "Interposed Request Routing for Scalable Network Storage," ACM Transactions on Computer Systems, Feb. 2002, vol. 20, No. 1, pp. 1-24.
Bright, J.D. et al., "A Scalable Architecture for Clustered Network Attached Storage," Twentieth IEEE/Eleventh NASA Goddard Conference on Mass Storage Systems & Technologies, Apr. 7-10, 2003, 12 pages, Paradise Point Resort, San Diego, CA, USA.
Goldick, J., "Retry of Extending Networking Design Notes," PSC, Carnegie-Mellon University, Feb. 1995, 42 pages.
"Leveraging the Benefits of the EMC CLARiiON IP4700 Network File Server With the Oracle8i Database," an Engineering White Paper, Mar. 5, 2002, EMC Corporation.
Notification of Transmittal of the International Search Report and the Written Opinion, PCT/US04/12841, Oct. 13, 2004, 9 pages.
"Notification of Transmittal of the International Search Report and the Written Opinion of the International Searching Authority, or the Declaration," for PCT/US04/12844, Mar. 14. 2005, 14 pages.
Notification of Transmittal of the International Search Report and Written Opinion, PCT/US04/12846, Sep. 28, 2004, 8 pages.
Notification of Transmittal of the International Search Report and Written Opinion, PCT/US04/12847, Nov. 3, 2004, 7 pages.
Notification of Transmittal of the International Search Report and the Written Opinion, PCT/US04/30180, Mar. 27, 2006, 8 pages.
US Advisory Action dated Nov. 21, 2007 issued in U.S. Appl. No. 10/832,785.
US Notice of Allowance and Examiner-Initiated Interview Summary dated Aug. 9, 2010 issued in U.S. Appl. No. 10/832,785.
US Advisory Action dated Nov. 27, 2007 issued in U.S. Appl. No. 10/831,701.
US Advisory Action dated Nov. 21, 2008 issued in U.S. Appl. No. 11/324,845.
US Examiner Interview Summary dated Mar. 31, 2009 issued in U.S. Appl. No. 11/241,554.
US Office Action Final dated Jul. 21, 2010 issued in U.S. Appl. No. 11/241,554.
US Examiner Interview Summary dated Sep. 14, 2010 issued in U.S. Appl. No. 11/241,554.
US Notice of Allowance dated Jul. 6, 2011 issued in U.S. Appl. No. 11/241,554.
US Notice of Allowance dated Oct. 28, 2011 issued in U.S. Appl. No. 11/241,554.
US Examiner Interview Summary dated Jul. 19, 2010 issued in U.S. Appl. No. 11/537,997.
US Office Action dated Mar. 31, 2011 issued in U.S. Appl. No. 11/537,997.
US Notice of Allowance dated Aug. 5, 2011 issued in U.S. Appl. No. 11/537,997.
US Notice of Allowance dated Nov. 28, 2011 issued in U.S. Appl. No. 11/537,997.
US Office Action dated Sep. 22, 2010 issued in U.S. Appl. No. 12/019,582.
US Final Office Action dated Feb. 25, 2011 issued in U.S. Appl. No. 12/019,582.
US Notice of Allowance dated Jun. 15, 2011 issued in U.S. Appl. No. 12/019,582.
US Notice of Allowance dated Sep. 30, 2011 issued in U.S. Appl. No. 12/019,582.
US Notice of Allowance dated Jan. 13, 2012 issued in U.S. Appl. No. 12/019,582.
US Office Action Final dated Aug. 3, 2010 issued in U.S. Appl. No. 10/942,762.
US Examiner Interview Summary dated Oct. 12, 2010 issued in U.S. Appl. No. 10/942,762.
US Office Action dated Jan. 20, 2011 issued in U.S. Appl. No. 11/478,998.
US Office Action dated Jul. 8, 2011 issued in U.S. Appl. No. 11/478,998.
US Office Action Final dated Dec. 22, 2011 issued in U.S. Appl. No. 11/478,998.
U.S. Appl. No. 60/667,567, filed Mar. 31, 2005, Wong et al.
U.S. Appl. No. 60/722,465, filed Sep. 30, 2005, Tsirigotis et al.
European Examination Report dated Nov. 9, 2010 issued in 04 750 678.7 -1245.
European Summons to attend oral proceedings dated Oct. 6, 2011 issued in EP Patent Application No. 04 750 678.7-1245.
PCT International Search Report dated Aug. 29, 2007 issued in PCT/US2006/038361.
PCT International Preliminary Report on Patentability and Written Opinion dated Aug. 29, 2007 issued in PCT/US2006/038361.
European Extended Search Report, Supplementary Search Report and Search Opinion dated Jun. 4, 2010 issued in EP 06 81 5981.
European Extended Search Report, supplementary European Search Report, and European Search Opinion dated Jul. 26, 2011 issued in EP 05 802 942.2.
Japanese Office Action (Notice of Grounds for Rejection) dated May 10, 2011 issued in JP 2007-534880.
PCT International Preliminary Report on Patentability and Written Opinion dated Jan. 9, 2008 issued in PCT/US2006/25430.
European Extended Search Report, Supplementary Search Report and Search Opinion dated Feb. 25, 2011 issued in EP 06 785 872.0.

Carns et al. (Oct. 1, 2000) "PVFS: A Parallel File System for Linux Clusters", *Proceedings of the 4th Annual Linux Showcase and Conference*, vol. 4, pp. 317-327, XP002532238, USENIX ASSOC, Atlanta, Georgia.

Katsurashima et al. (2003) "Design and Evaluation of CIFS Server Virtualization Method", *Technical Research Report (IEICE), The Institute of Electronics Information and Communication Engineers*, 103(248): 73-78.

Sheth et al., "Data structure distribution and multi-threading of Linux file system for multiprocessors", 5th International Conference on High Performance Computing, 1998 (HIPC '98); Madras, India Dec. 17-20, 1998, IEEE Comput. Soc, US, Dec. 17, 1998, pp. 97-104, XP010317644, DOI: DOI:10.1109/HIPC.1998.737976.

* cited by examiner

CUSTOMIZING A NAMESPACE IN A DECENTRALIZED STORAGE ENVIRONMENT

CROSS-REFERENCE TO RELATED APPLICATIONS

This application is a continuation-in-part to U.S. patent application Ser. No. 10/831,376, filed on Apr. 23, 2004, now U.S. Pat. No. 7,346,664, entitled "Transparent File Replication Using Namespace Replication," by Thomas K. Wong et al., the contents of which are hereby incorporated by reference in its entirety.

BACKGROUND OF THE INVENTION

1. Field of the Invention

This invention relates generally to storage networks and, more specifically, to a network device that generates a synthetic namespace to customize directories in a decentralized storage network.

2. Description of Related Art

In a computer network, NAS (Network Attached Storage) file servers connected directly to the network provide an inexpensive and easily configurable solution for a storage network. These NAS file servers are self-sufficient because they contain file systems that allow interoperability with clients running any operating system and communication using open protocols. For example, a Unix-based client can use the NFS (Network File System) protocol by Sun Microsystems, Inc. of Santa Clara, Calif. and a Windows-based client can use CIFS (Common Internet File System) by Microsoft Corp. of Redmond, Wash. to access files on a NAS file server. However, the operating system does not affect communication between the client and file server. Thus, NAS file servers provide true universal file access.

By contrast, more expensive and powerful SAN (Storage Area Network) file servers use resources connected by Fibre Channel on a back-end, or a dedicated network. A SAN file system is part of the operating system or an application running on the client. But heterogeneous client operating systems may require additional copies of each file to be stored on the storage network to ensure compatibility on the SAN file server. Additionally, communication between file servers on a SAN use proprietary protocols and thus are typically provided by a common vendor. As a result, NAS file servers are preferred when price and ease of use are major considerations. However, the differences between NAS storage networks and SAN storage networks also have drawbacks.

One drawback with NAS file servers is that there is no centralized control. Accordingly, each client must maintain communication channels to each of the NAS file servers separately. When NAS file servers are either added or removed from the storage network, each client must mount or unmount directories for the associated storage resources as appropriate. This is particularly inefficient when there are changes in hardware, but not in the particular files available on the network, such as when a failing NAS file server is replaced with an identically configured back-up NAS file server.

A related drawback is that a client must be reconfigured each time a file is relocated within the storage network, such as during file migration or file replication. The client generates a NAS file handle that identifies a physical location of the directory or file object on the file server using a file handle or path name. To access the object, the client sends an object access request directly to the NAS file server. When the file is relocated to a different NAS file server, a new file handle is required.

An additional drawback with NAS file servers is that mounted directories are typically tied to the physical share. Different physical shares can be on different file servers. When mounted, the client views a namespace of the physical share to find a file or directory, and is limited to that particular physical share. However, related files and directories can be spread across different physical shares. In addition, an administrator may want to limit access or permissions of users within the physical shares.

Therefore, what is needed is a network device to customize a namespace with a synthetic namespace. Furthermore, the namespace should provide, for example, a per user or per location customization.

BRIEF SUMMARY OF THE INVENTION

The present invention meets these needs by using a synthetic namespace to customized a namespace. More specifically, a synthetic namespace is generated from one or more file location tables that map switch file handles to NAS file handles. The NAS file handles can represent, an object such a file or directory, located on a file server. The NAS file handles are tied to an exported physical share, however, the switch file handles are independent of physical exports. In one example, the synthetic namespace presents a home directory corresponding to a location of a user. Other customizations on a per user, per group of users, or per location are possible.

A NAS switch, in the data path of a client and NAS file servers, reliably coordinates file migration of a source file server to a destination file server using namespace replication to track new file locations. Additionally, the NAS switch maintains data availability during time-consuming data transfers. The NAS switch in communication with the client on a front-end of the storage network, and both a source file server and a destination file server on a back-end. The NAS switch associates NAS file handles (e.g., NFS file handles or CIFS path names) received from the source and destination file servers with switch file handles that are independent of a location. The NAS switch then sends the switch file handles to the client. In response to subsequent object access requests from the client, the NAS switch substitutes switch file handles with appropriate NAS file handles for submission to the appropriate NAS file server.

In another embodiment, the NAS switch uses a file location table to generate and access synthetic namespaces. For example, each user or location can be assigned a different file location table. That file location table includes switch file handles and NAS file handles corresponding to documents selected to be part of the synthetic namespace. The file location table can be similar to a file handle migration table maintained by the NAS switch to track objects that are moved from one location on the storage network to another. While the handle migration tables typically track objects from a particular physical share, the file location tables allow namespaces to be customized without regard to physical shares containing the objects. Thus, to the NAS switch, the file location table appears to contain migrated objects.

The features and advantages described herein are not all inclusive, and, in particular, many additional features and advantages will be apparent to one skilled in the art in view of the drawings, specifications, and claims. Moreover, it should be noted that the language used in the specification has been principally selected for readability and instructional purposes and may not have been selected to circumscribe the claimed invention.

DETAILED DESCRIPTION OF THE INVENTION

Systems and methods for generating customized namespace are described. A namespace, as referred to herein, is specific to a physical share from which the namespace is exported. The namespaces of several physical shares can be combined and presented to clients as a unified namespace (also referred to as a "global namespace"). From the unified namespace, a synthetic namespace can be limited to a subset of designated objects that are independent of the physical share. For example, one synthetic namespace can be configured to include objects that are document files while another synthetic namespace can be configured to include objects that are graphical files. In another example, one synthetic namespace can be configured to include objects related to an engineering department while another synthetic namespace can be configured to include objects related to a marketing department. In other examples, synthetic namespaces can be segregated according to location, permissions (e.g., read only, read/write), date, time, etc. The synthetic namespaces and other namespaces presented to clients are managed by a NAS (Network Attached Storage) switch in the data path of a client and NAS file servers on the storage network.

Although many of the preferred embodiment and examples described herein refer to file handles used in NFS, the same embodiments and examples apply to path names used in CIFS, and generally, any other location-based pointer that is used in a public or proprietary protocol.

Figure 1:
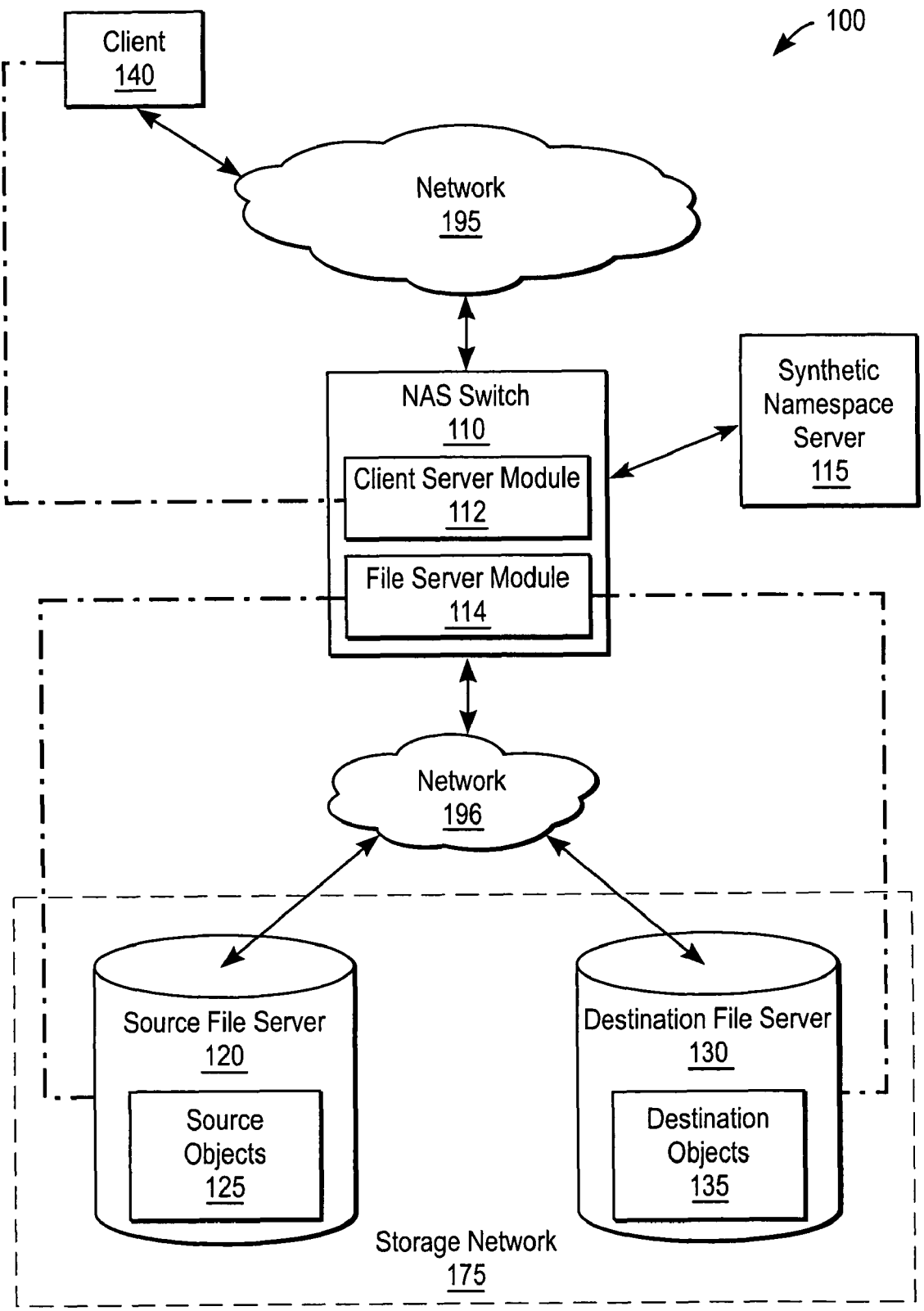
FIG. 1 is a high-level block diagram illustrating a storage network system according to one embodiment of the present invention.

FIG. 1 is a high-level block diagram illustrating a storage network system 100 according to one embodiment of the present invention. The system 100 comprises a NAS switch 110 and a client 140 coupled to a network 195. The NAS switch 110, a synthetic namespace server 115, a source file server 120, and a destination file server 130, are each coupled in communication through a network 196. Note that there can be various configurations of the system 100, such as embodiments including additional clients 140, additional source and/or destination file servers 120, 130, and additional NAS switches 110. The system 100 components are implemented in, for example, a personal computer with an x86-type processor executing an operating system and/or an application program, a workstation, a specialized NAS device with an optimized operating system and/or application program, a modified server blade, etc. In one embodiment, the storage network 175 comprises a NAS using protocols such as NFS and CIFS. In another embodiment, the storage network 175 comprises a combination of NAS, SAN, and other types of storage networks. In yet another embodiment the storage network 175 comprises a decentralized standard or proprietary storage system other than NAS.

The NAS switch 110 provides continuous transparency to the client 140 with respect to object management. Specifically, the NAS switch can off-load tasks related to physical configurations, object management, object migration, object replication, efficient storage and/or other services on the storage network 175. Preferably, the NAS switch 110 emulates file server processes to the client 140 and emulates client processes to the file servers 120, 130. Accordingly, the client 140 is unaware of the NAS switch 110 since the NAS switch 110 is able to redirect NAS requests intended for the source file server 120 to appropriate locations on the destination file server 130. Thus, the client 140 submits object requests, such as file writes and directory reads, directly to the NAS switch 110. Likewise, the file servers 120, 130 could be unaware of the NAS switch 110 since the NAS switch 110 is able to resubmit requests, contained in server file handles, as if they originated from the client 140. To do so, the NAS switch 110 can use mapping, translating, bridging, packet forwarding, other network interface functionality, and other control processes to perform file handle switching, thereby relieving the client 140 of the need to track changes in a file's physical location.

In one embodiment, the NAS switch 110 comprises a client module 112 and a file server module 114 to facilitate communications and file handle switching. The file server module 114 receives exported file system directories from the file servers 120, 130 containing NAS switch handles. To create compatibility between the client 140 and the NAS switch 110, the client module 112 maps the file system directories to internal switch file systems which it sends to the client 140. To request an object, the client 140 traverses an exported switch file system and selects a switch file handle which it sends to the NAS switch 110 along with a requested operation.

The file server module 114 coordinates migration processes. The file server module 114 initiates tasks that are passively performed by the source and destination file server 120, 130, which may not have native migration capabilities. The file server module 114 replicates a namespace containing the data to be migrated from the source file server 120 to the destination file server 130, and then replicates associated data. During and afterwards, the file server module 114 redirects namespace and file object accesses request by the client 140 to appropriate locations. Thus, data transfer services remain available to the client 140.

In one embodiment, the file server module 114 also tracks reconfigurations resulting from migration, replication and other object relocation processes (e.g. adding or removing file server capacity) with a nested system of tables, or information otherwise linked to the switch file systems. The switch file handles are static as they are persistent through the relocation processes, but the associated NAS file handles can be dynamic as they are selected depending upon an object's current location. To track various copies of an object, the file server module 114 maintains a file handle migration table and a file handle replication table corresponding to each file system that maps NAS file handles of migrated and replicated objects to locations on the storage network 175. In one embodiment, the file server module 114 maintains a file location table corresponding to synthetic namespaces used for customization of namespaces as presented to the client 140 or a user of the client, as described in greater detail below. Further embodiments of the file server module 114 are described with respect to FIG. 2.

The client module 112 associates 310 a NAS server file handle or physical file handle (referred to herein as a NAS file handle), or a path name, with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

In general, NAS file handles uniquely identify objects, such as a directory file server, on the file servers 120, 130, such as a directory or file, as long as that object exists. NAS file handles are file server specific, and are valid only to the file servers 120, 130 that issued the file handles. Under NFS, the process of obtaining a file handle from a file name is called a look-up, and under CIFS, the process of obtaining a path name from a file name is called an open. The NAS file handle may be formatted according to protocols such as NFS or CIFS as discussed in further detail below, e.g., with reference to Tables 1A and 1B. By contrast, a switch file handle identifies a directory or file object independent of location, making it persistent through file replications, migrations, and other data transfers. The switch file handle can be a modified NAS file handle that refers to an internal system within the NAS switch 110 rather than the source file server 120. This enables the NAS switch 110 to map persistent file handles to a choice of alternative NAS file handles. An original NAS file handle refers to an initial object location on the source file server 120, and a stored NAS file handle refers to a current object location.

Object access requests handled by the NAS switch 110 include, for example, directory and/or file reads, writes, creation, deletion, moving, copying, opening, or closing. A namespace access refers to an operation accessing or modifying the namespace such as look-up, rename, delete, or create. A file access refers to an operation accessing or modifying files such as read or write. An object can refer to a directory object or a file object. Directory objects can further comprise sub-directories and file objects within directory. As used herein, various terms are used synonymously to refer to a location of an object prior to migration (e.g., "primary"; "source"; "original"; and "first") and various terms are used to refer to a location of the same object after migration (e.g., "replica"; "destination"; "substitute"; and "second"). Further embodiments of the NAS switch 110 and methods operating therein are described below.

The client 140 accesses resources on the file servers 120, 130 by submitting a switch file handle to the NAS switch 110. To find the switch handle, the client 140 first mounts an exported switch file system containing switch file handles. The client 140 looks-up an object to obtain its file handle and submits an associated request. From the perspective of the client 140, transactions are carried out by the NAS switch 110 having object locations that do not change. Thus, the client 140 interacts with the NAS switch 110 before and after a file replication in the same manner. A user of the client 140 can submit operations through a command line interface, a windows environment, a software application, or otherwise. In one embodiment, the NAS switch 110 further provides access to a storage network 175 other than a NAS storage network.

The source file server 120 is the default or original network file server for the client 140 before file migration. The source file server 120 further comprises source objects 125, which include namespace directories and files such as enterprise data, records, database information, applications, and the like. The source file server 120 can store a table of migrated directories maintained by the NAS switch 110 that correlate results from namespace migration. Moreover, the source file server 120 can store a file handle migration table, maintained by the NAS switch 110, denoting each migrated directory and file object. The source file server 120 comprises, for example, a personal computer using an x86-type processor with an operating system and/or an application, a workstation, a specialized NAS device with an optimized operating system and/or application, a modified server blade, etc.

The destination file server 130 becomes the primary network file server used by the NAS switch 110 after file migration. The destination file server 130 further comprises destination objects 135, which include the replicated namespace directories and source files. The destination file server 130 can comprise the same hardware and/or software as described with reference to the source file server 120. The source and destination file servers 120, 130 are preferably NAS file server, but can also be file servers using other decentralized protocols that do not inherently support file migration. Further embodiments of the source and destination file servers 120, 130 and related methods are described below.

Optionally, the synthetic namespace server 115 is a dedicated physical share to store synthetic namespaces. The synthetic namespace server 115 contains a directory hierarchy of file location tables. To the NAS switch 110, the file location tables are similar to the file handle migration tables, although the objects referred to in the file location tables have not actually migrated. In other words, synthetic namespaces can be implemented by fake migrations. Because only metadata is stored, the directory can be replicated and distributed to multiple sites within an organization.

The network 195 facilitates data transfers between connected hosts (e.g., 110, 140). The connections to the network 195 may be wired and/or wireless, packet and/or circuit switched, and use network protocols such as TCP/IP (Transmission Control Protocol/Internet Protocol), IEEE (Institute of Electrical and Electronics Engineers) 802.11, IEEE 802.3 (i.e., Ethernet), ATM (Asynchronous Transfer Mode), or the like. The network, 195 comprises, for example, a LAN (Local Area Network), WAN (Wide Area Network), the Internet, and the like. In one embodiment, the NAS switch 110 acts as a gateway between the client 140, connected to the Internet, and the directory file server 120, and the shadow file servers 130, connected to a LAN. The network 196 is preferably a local area network providing optimal response time to the NAS switch 110. In one embodiment, the network 196 is integrated into the network 195.

Figure 2:
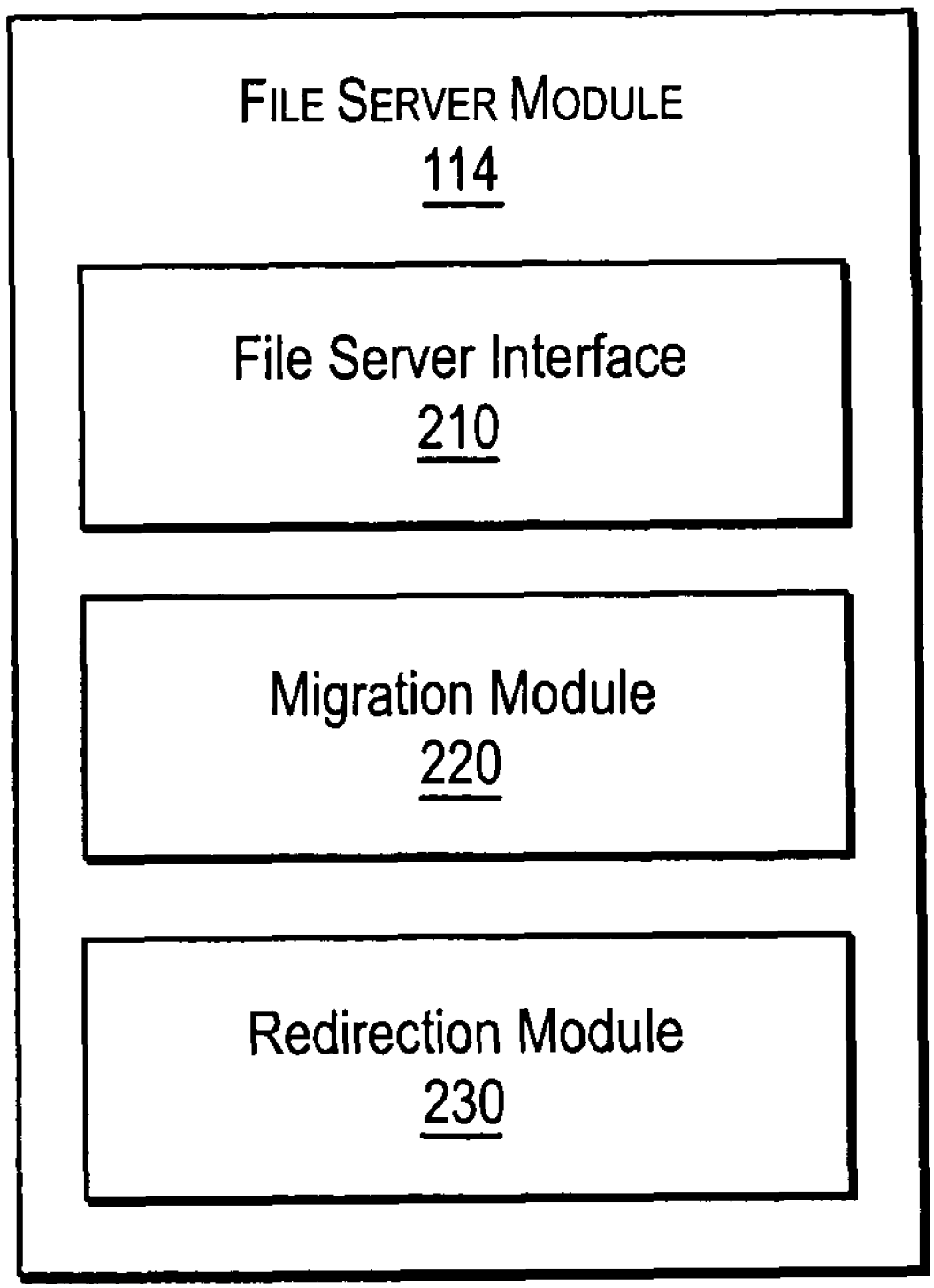
FIG. 2 is a block diagram illustrating a network attached storage (NAS) file server module according to one embodiment of the present invention.

FIG. 2 is a block diagram illustrating the file server module 114 according to one embodiment of the present invention. The file server module 114 comprises a file server interface 210, a migration module 220, and a redirection module 230. Generally, the file server interface 210 manages operations before migration, the migration module 220 maintains data availability during migration, and the redirection module 230 provides transparency to the client 140 after migration. Note that modules are merely exemplary groupings of functionality.

Prior to file migration, the file server interface 210 receives a switch file handle with a request from the client 140 which it uses to find an original NAS file handle. The file server interface 210 submits the original NAS file handle with the request to the source file server 120. If the object has yet to change locations in the storage network 175, the file server interface 210 uses the original NAS file handle. The file server interface 210 can submit the switch file handle to the migration module 220 to determine if the object is part of a data migration. Also, the file server interface 220 can submit the switch file handle to the redirection module 230 to determine if the object has completed data migration. In either case, an appropriate NAS file handle is returned for the file server interface 210 to use in forwarding the client request to the appropriate file server 120, 130

During file migration, a migration module 220 in the NAS switch 110 coordinates migration from the source file server 120 to the destination file server 130 using namespace replication. Namespace replication copies directory metadata of the source file server 120 separately from the data itself. As the migration module 220 walks through the directories to copy data, it updates a file handle migration table that indicates whether an object has been migrated, and if so, where the object has been migrated. Because the namespace replication is many times faster than the data migration, directory services remain available even while the data migration occurs. The file handle migration table provides a current list of which objects have been migrated so that the NAS switch 110 is able to provide nearly continuous data availability. In one embodiment, the NAS switch can reconstruct the file handle migration table in response to, for example, a device crash or data corruption.

After file migration, the redirection module 230 looks-up switch file handles received from the client 140 in the file handle migration table. If an object has been migrated, the redirection module outputs a destination NAS file handle corresponding to a location on the destination file server 130. In one embodiment, the creation of synthetic namespaces appear to be migrations. Thus, the redirection module 230 looks-up switch file handles in the file location tables as well.

Figure 3:
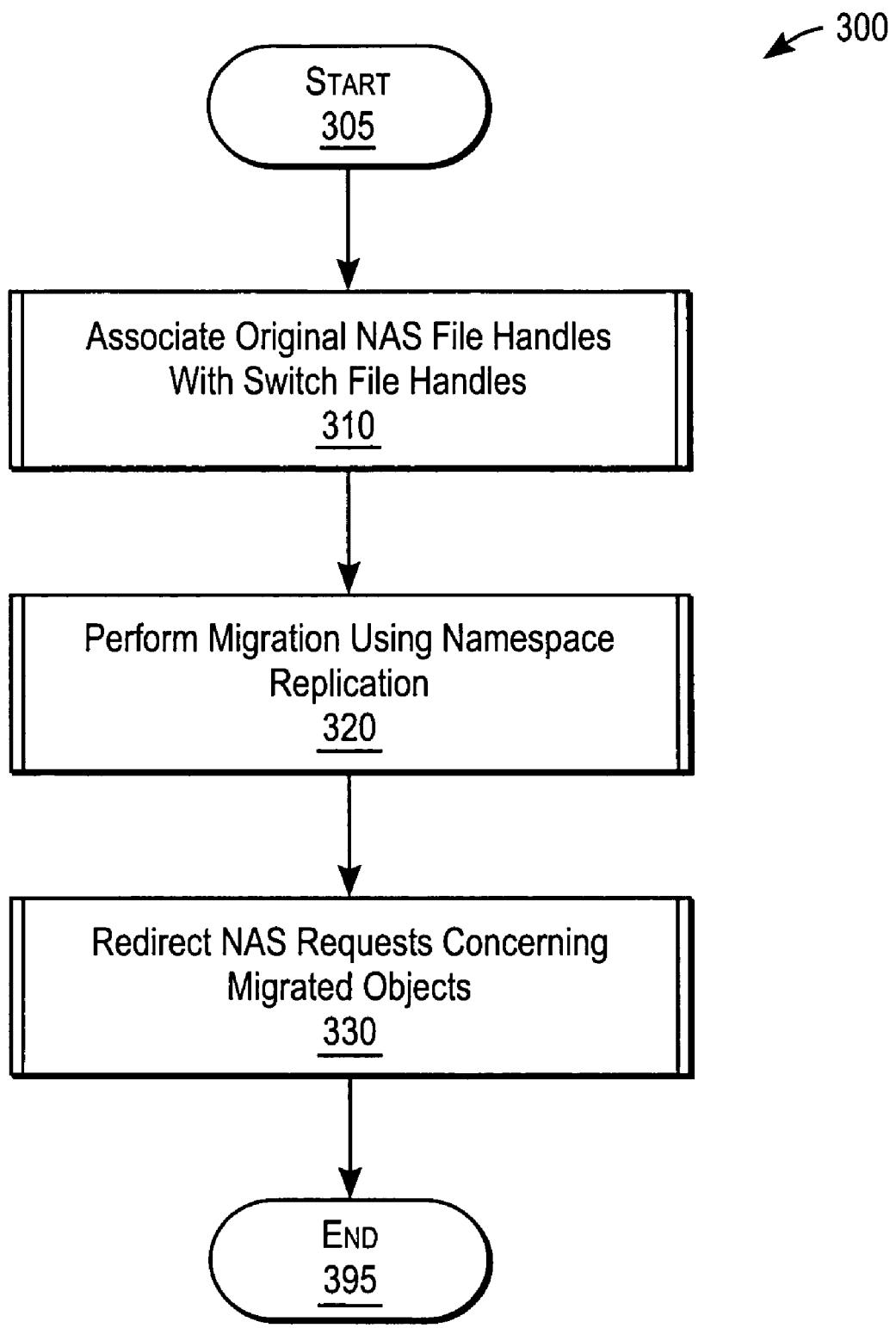
FIG. 3 is a high-level flow chart illustrating a method of providing transparent file migration in a NAS storage network according to one embodiment of the present invention.

FIG. 3 is a high-level flow chart illustrating a method 300 of providing transparent file migration in a NAS storage network according to one embodiment of the present invention. The client module 112 associates 310 an original NAS file handle with a switch file handle as described below with respect to FIG. 4. This enables the NAS switch 110 to act as an intermediary between the client 140 and the file servers 120, 130. The client 140 submits NAS requests using switch file handles as if the NAS switch 110 were a file server 120, 130, and, in turn, the file servers 120, 130 process NAS file handles from the NAS switch 110 as if they were submitted by the client 140.

The migration module 220 performs 320 file migration using namespace replication as described below with respect to FIGS. 5-9. By separating directory replication from data replication, the migration module 220 is able to maintain availability and data integrity between the file servers 120, 130.

The redirection module 230 redirects 330 NAS requests concerning migrated files as described below with respect to FIG. 10. Because the NAS switch 110 coordinates and stores elements involved in migration, the client 140 continues referring to objects stored in alternative locations with the same switch file handle used prior to replication. On the back end, however, many changes can occur. For example, file migration relocates the source objects 125 from the source file server 120 to the destination file server 120.

Figure 4:
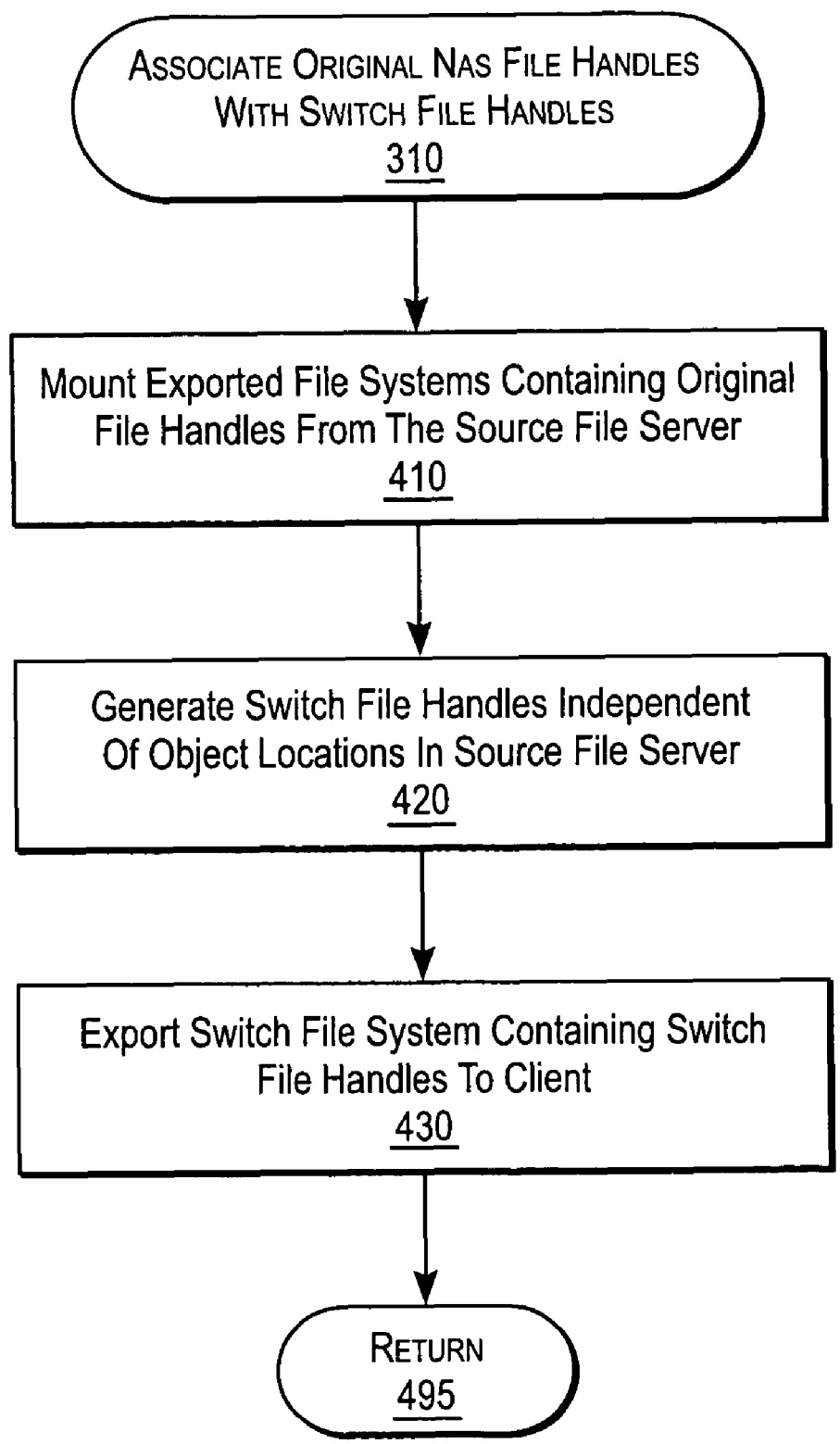
FIG. 4 is a flow chart illustration a method of associating original NAS file handles with switch file handles according to one embodiment of the present invention.

FIG. 4 is a flow chart illustration the method 310 of associating a NAS file handle with a switch file handle according to one embodiment of the present invention. Initially, the NAS switch 110 mounts 410 an exported directory of file systems from the primary server 120 in general, the file system organizes objects on the file servers 120, 130 into a directory hierarchy of NAS file handles. In one embodiment, the NAS switch 110 receives exported directories from associated source file servers 120 and, in turn, sends exported directories to associated clients 140.

The client module 112 generates 420 switch file handles independent of object locations in the primary file server 120. The client module 112 organizes exported file systems from the file server 120 by replacing file system or tree identifiers with a switch file system number as shown below in Tables 2A and 2B. The client module 112 exports 430 the switch file system to the client 140 to use in requesting operations. In the reverse process, the NAS switch 110 receives the NAS request and searches replicated file handles and/or replicated namespaces using the NAS file handle. Accordingly, the file server interface 210 checks entries of nested tables maintained by the synchronization module 230. The file server interface 210 generates a NAS file handle from the switch file handle based on an object location. An example of the contents of an NFS and CIFS file handle are shown in Tables 1A 1B, while an example of switch file handles or modified NFS and CIFS file handles are shown in Tables 2A and 2B:

TABLE 1A

NFS File Handle Contents

| Field Name | Description |
| --- | --- |
| fsid | File system identification - identifies an exported file system of a file server |
| file id | File identification - identifies a file or directory object of an exported file system |
| gen id | Generation identification - changes each time the file identification is re-used to identify a different file or directory object |

TABLE 1B

CIFS File Handle Contents

| Field Name | Description |
| --- | --- |
| tree id | Tree identification - assigned by a CIFS server |
| file id | File identification - unique within a tree identification |

TABLE 2A

Content of NFS Switch File Handle

| Field Name | Description |
|---|---|
| file system id | File system identification - index to NAS switch 110 file system export table that identifies the name and location of a NAS files search |
| file id | File identification - identifies a file or directory object of an exported file system |
| gen id | Generation identification - changes each time the file identification is re-used to identify a different file or directory object |

TABLE 2B

Contents of CIFS Switch File Handle

| Field Name | Description |
|---|---|
| file system id | File system identification - index to NAS switch 110 file system export table that identifies the name and location of a NAS files search |
| file id | File identification - unique within a tree identification |

As discussed below, after objects have been migrated, the NAS switch 110 can accesses objects at new locations using updated NAS file handle.

Figure 5:
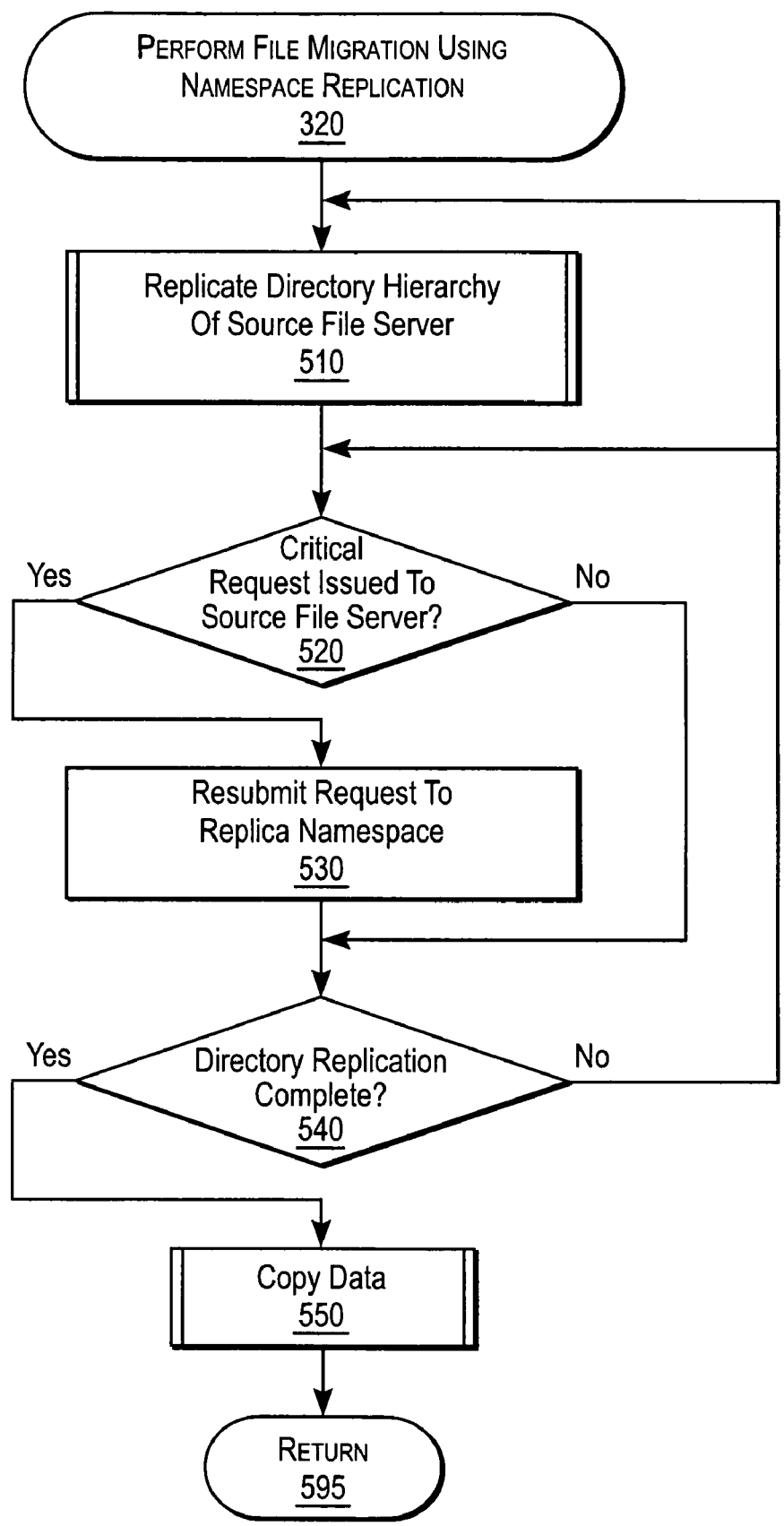
FIG. 5 is a flow chart illustrating a method of performing file migration using namespace replication according to one embodiment of the present invention.

FIG. 5 is a flow chart illustrating the method 220 of performing file migration using namespace replication according to one embodiment of the present invention. The migration module 220 replicates 510 a directory hierarchy of the source file server 120 as described below with respect to FIGS. 6-7. In one embodiment, when an object access request such as a directory operation is received from the client 140, it is sent to both the first and destination file servers 120, 130 to maintain consistency between the namespace and replicated namespace. A directory can thus be created or deleted during the file migration process whereas in the systems of the prior art, the directory would be locked so that such operations would not be possible.

If a critical directory request is issued to the source file server 520 during file migration 510, the migration module 220 resubmits 530 the request to update the replicated namespace. Preferably, the replicated namespace is stored on the destination file server 130. As a result, when operations such as a create directory, create file, delete, directory, delete file, and the like affect the source namespace, that same modification is made to the replicated namespace. Once the directory replication is complete 540, critical directory operations can be submitted directly to the replicated namespace. In a separate process, the migration module 220 copies 550 data from the source file server 120 to the destination file server 130.

Figure 6:
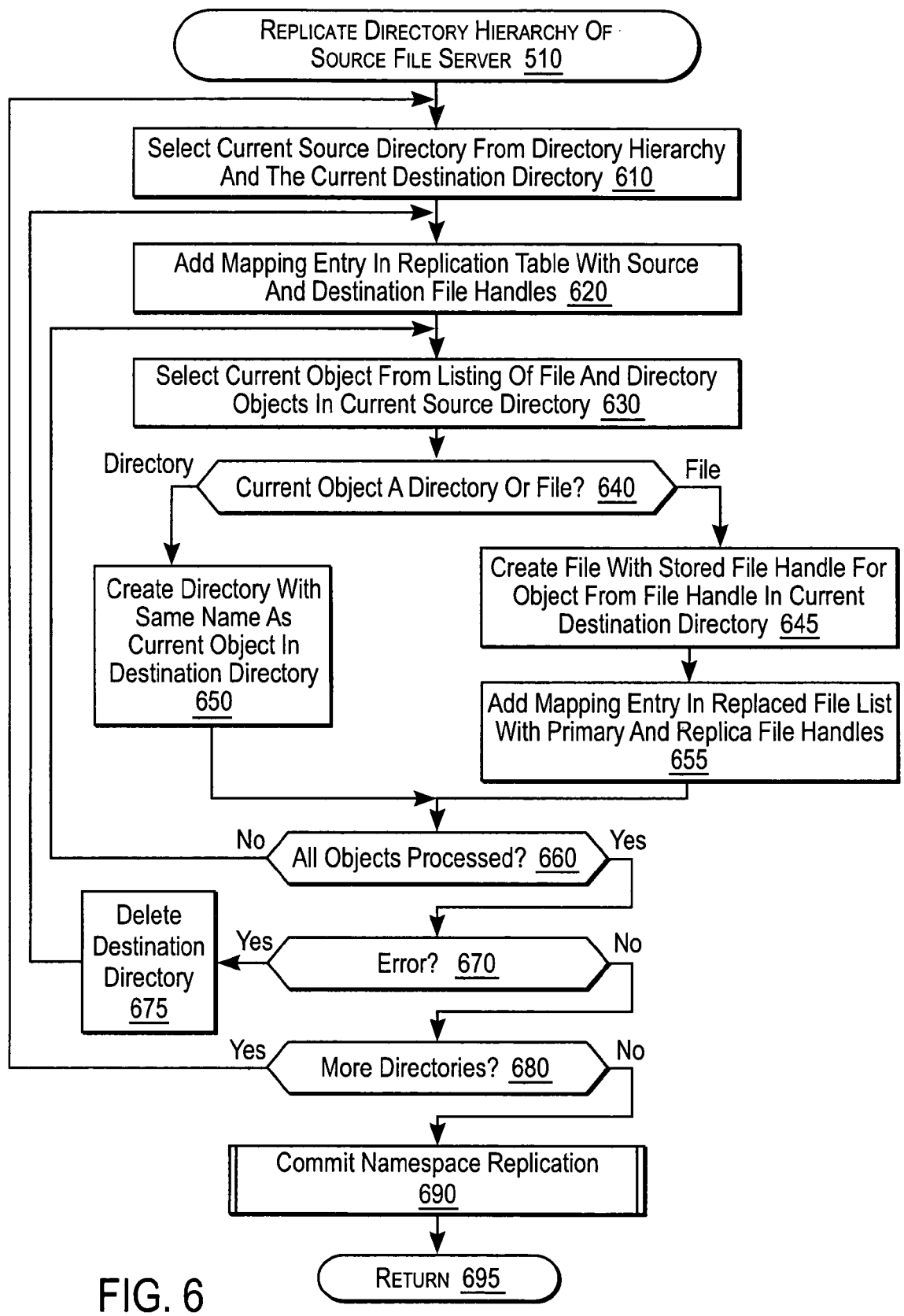
FIG. 6 is a flow chart illustrating a method of replicating a directory hierarchy of a source file server according to one embodiment of the present invention.

FIG. 6 is a flow chart illustrating the method 510 of replicating a directory hierarchy from the source file server 120 to the destination file server 130 according to one embodiment of the present invention. The reproduction module 220 selects 610 a current source directory from the directory hierarchy of the source file server 120 and the current destination directory from the destination file server 130. The migration module 220 adds 620 a mapping entry in a replication table with switch file handles related to the source and destination locations. The migration module 220 selects 630 a current object from a listing of file and directory objects in the current source directory.

If the current object is a directory 530, the migration module 220 creates 650 a directory in the destination file server 130 with the same name as the current directory in the primary file server 120. On the other hand, if the current object is a file 640, the reproduction module 220 creates 645 a file with a stored file handle for the object from the file handle in the current destination directory. In one embodiment, the stored file handle is similar to the switch file handle. Preferably, the stored file handle is a predetermined size so that the NAS switch 110 can determine whether a file contains a stored file handle merely by inspecting the file's size. An exemplary stored file format is shown in Table 3:

TABLE 3

Exemplary Stored File Handle

| Byte Offset | Length | Name | Description |
|---|---|---|---|
| 0-3 | 4 | Stored file handle identifier | 0x06072022 |
| 4-7 | 4 | Stored file handle type | =1 for NFS, =2 for CIFS |
| 8-11 | 4 | Size of stored file handle | Hash value from switch file handle |
| 12-15 | 4 | Contents of stored file handle | Size in bytes |
| 12-size of switch file handle | Size of switch file handle | Padding | See above description |
| | Enough bytes to pad to a length of 419 bytes for NFS and 431 bytes for CIFS | | =0x0 byte |

Note, however, that there can be variations of the stored file format. The migration module 220 adds 655 a mapping entry in a replicated file list with source and destination switch file handles.

If all objects have been processed 660, no errors were committed in the process 670, and there are no more directories to replicate 680, the reproduction module 220 commits 690 the namespace replication. However, if there are more objects to be processed 660, the migration module 220 continues the process from selecting 630 objects. If there was an error in the directory or file creation 670, the reproduction module 220 deletes 675 the destination directory, and repeats the process from adding 620 mapping entries. Also, if there are more directories to process 680, the first file server 120 returns to selecting 510 primary directories.

Figure 7:
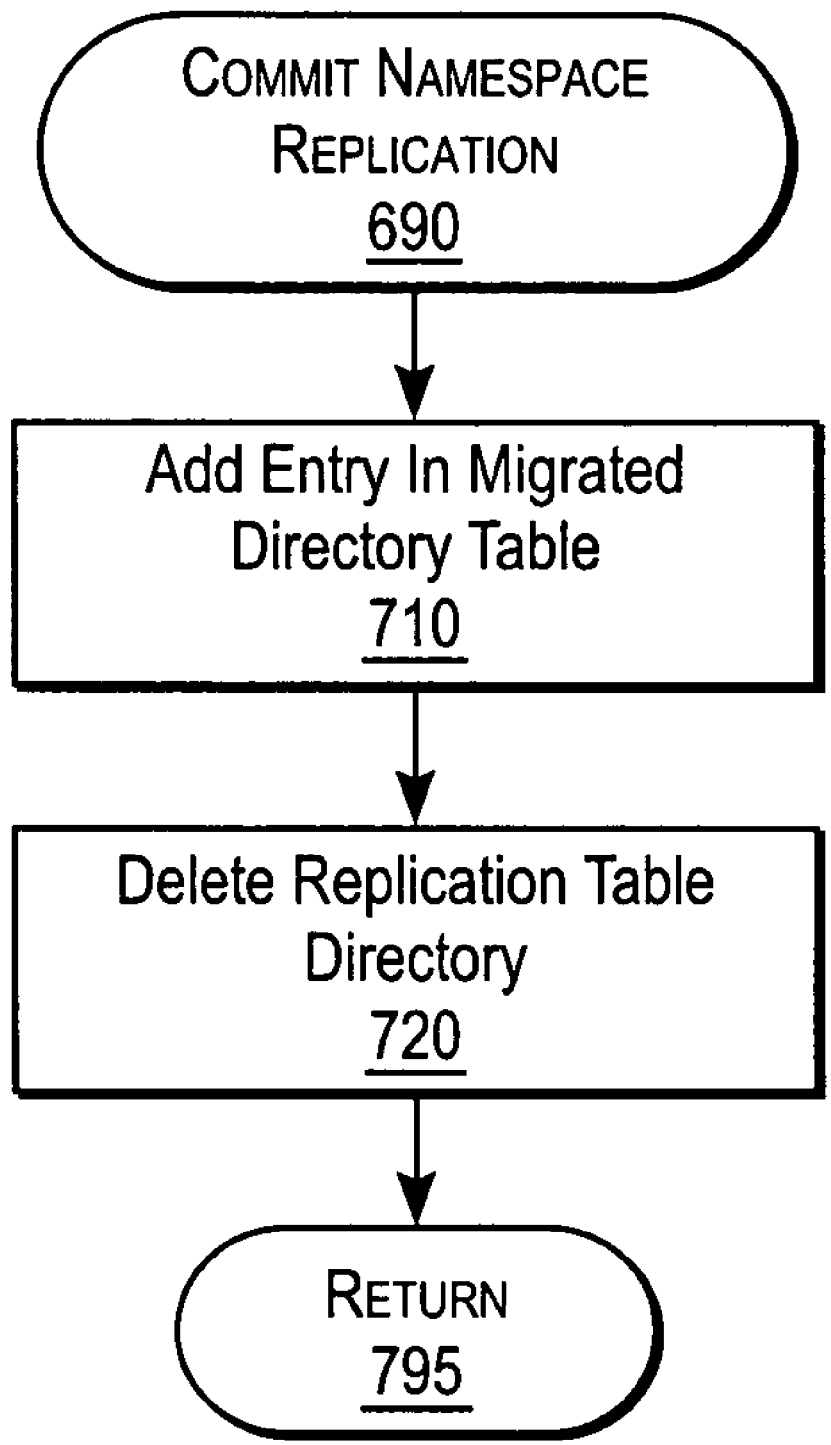
FIG. 7 is a flow chart illustrating a method of committing namespace replication according to one embodiment of the present invention.

The migration module 220 commits 690 the namespace as shown in FIG. 7. FIG. 7 is a flow chart illustrating the method 590 of committing the namespace replication according to one embodiment of the present invention. The migration module 220 adds 710 an entry to the migrated directory table. As a result, future object access requests will be directed to the destination file server 130 rather than the source file server 110. The source file server 120 deletes 720 the replication table since it is no longer needed.

Figure 8:
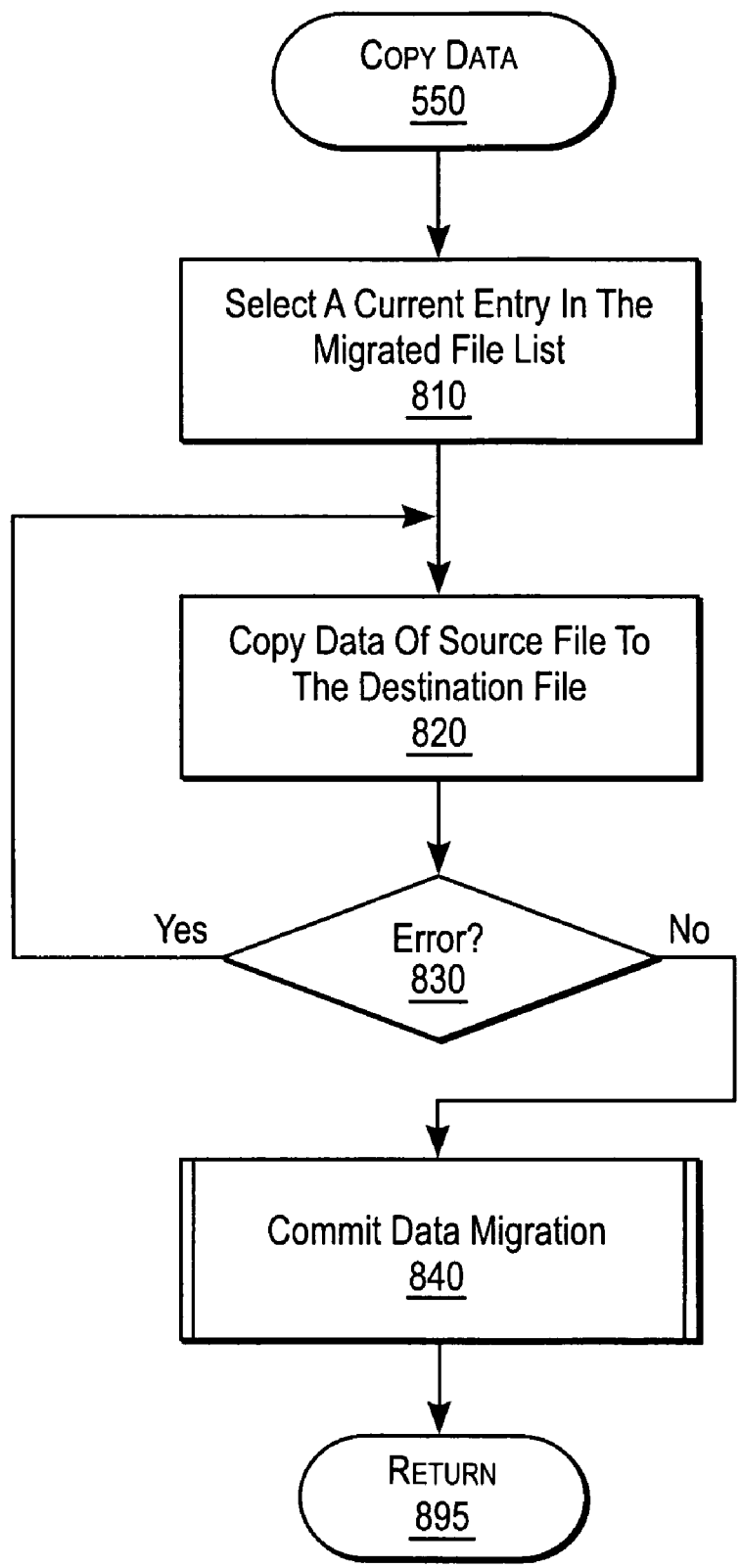
FIG. 8 is a flow chart illustrating a method of copying data according to one embodiment of the present invention.

FIG. 8 is a flow chart illustrating the method 420 of copying data according to one embodiment of the present invention. The NAS switch 110 selects 810 a current entry in the migrated file list. The source file server 120 copies 820 the data of the source objects 125 to the destination objects 135 in the destination file server 130.

Figure 9:
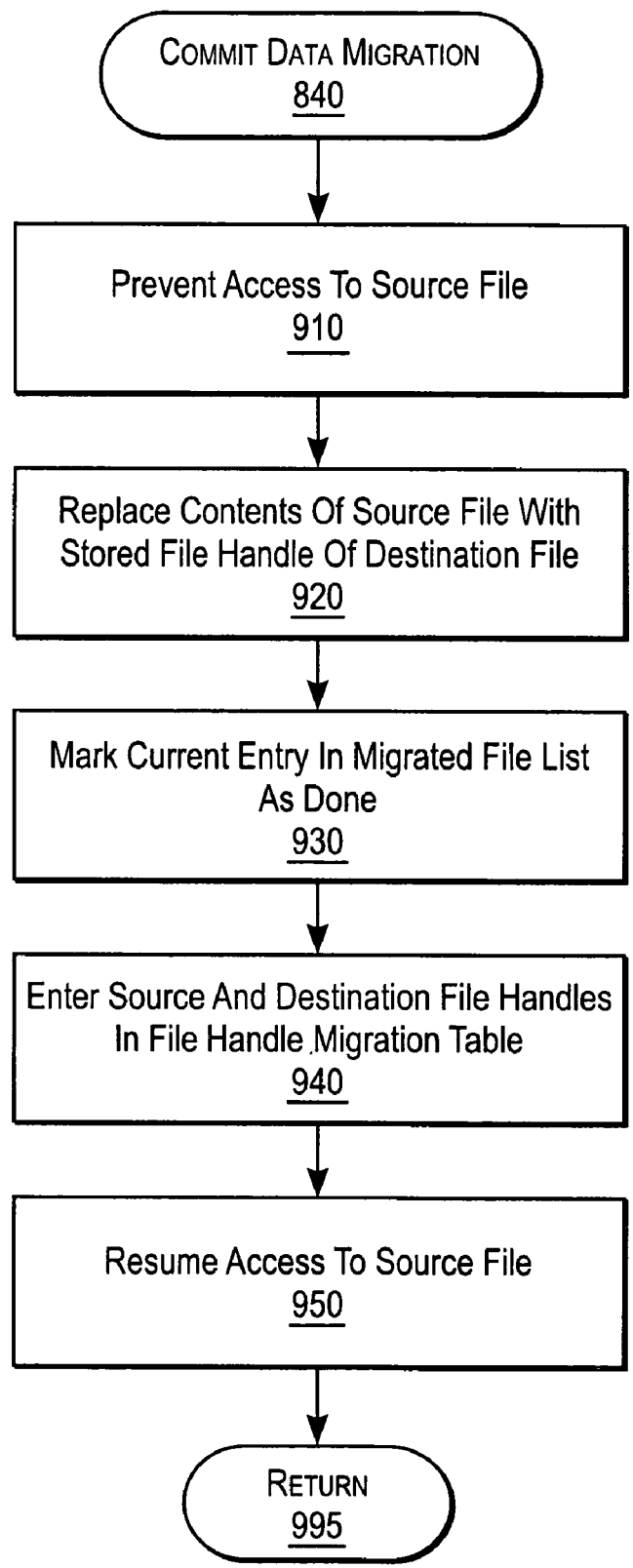
FIG. 9 is a flow chart illustrating a method of committing data migration according to one embodiment of the present invention.

If no error occurs during the data transfer 830, the destination file server 130 commits 840 the data migration as shown in FIG. 9. FIG. 9 is a flow chart illustrating the method 840 of committing data migration according to one embodiment of the present invention. The migration module 220 locks 910 the source file to prevent further access to the file. The migration module 220 replaces 920 the contents of the source file with a stored file handle indicating the new location on the destination file server 130. The migration module 220 marks 930 the current entry in the migrated file list as done, and enters 840 the source and destination file handles indicative of the locations on the source and destination file servers 120, 130 in the file handle migration table. Finally, the migration module 220 resumes 950 access to the source file.

In one embodiment, the migration module 220 reconstructs the migration module 220 due to, for example, a device crash or data corruption. To do so, the migration module 220 walks through the namespace of the source file server 120. Since the stored file handles have a consistent size, the migration module 220 can quickly recognize stored file handles and retrieve pointer information. This association is added to entries in a reconstructed file handle migration table.

Referring again to FIG. 8, if an error does occur 830, the data transfer is repeated. In one embodiment, the destination file server 110 detects an error by comparing the file size before migration to the file size after migration.

Figure 10:
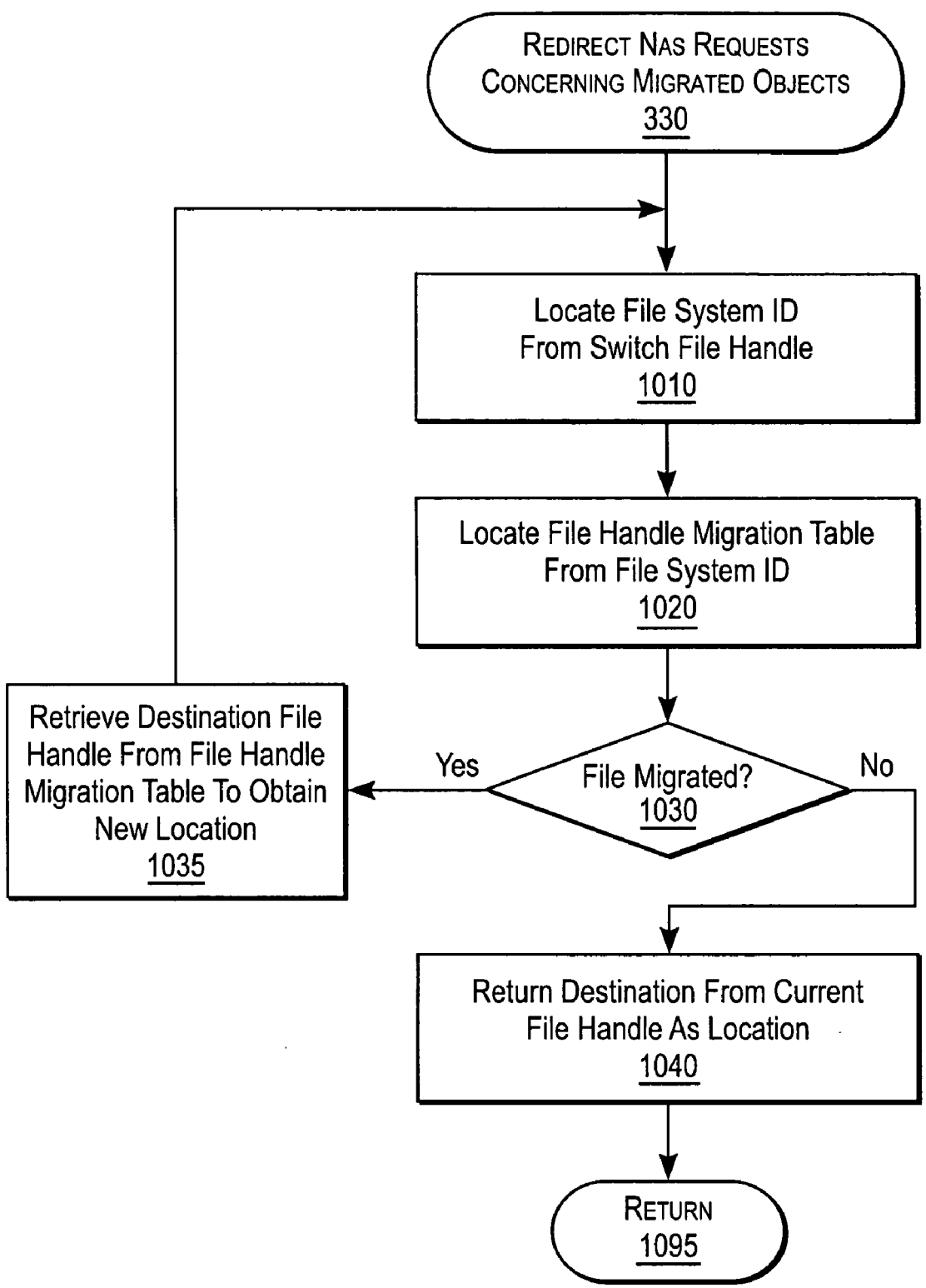
FIG. 10 is a flow chart illustrating a method of redirecting NAS requests concerning migrated objects according to one embodiment of the present invention.

FIG. 10 is a flow chart illustrating the method 330 of redirecting NAS requests concerning migrated objects according to one embodiment of the present invention. The NAS switch 110 locates 1010 a file system ID in the file systems table from the switch file handle. The NAS switch 110 next locates 1020 the file handle migration table from the file system ID. If the file has not migrated 1030, the NAS switch 110 forwards the client request using the source or original NAS file handle. If the file has migrated 1030, the NAS switch 110 retrieves the destination NAS file handle from the file handle migration table in the source file server 120.

Figure 11:
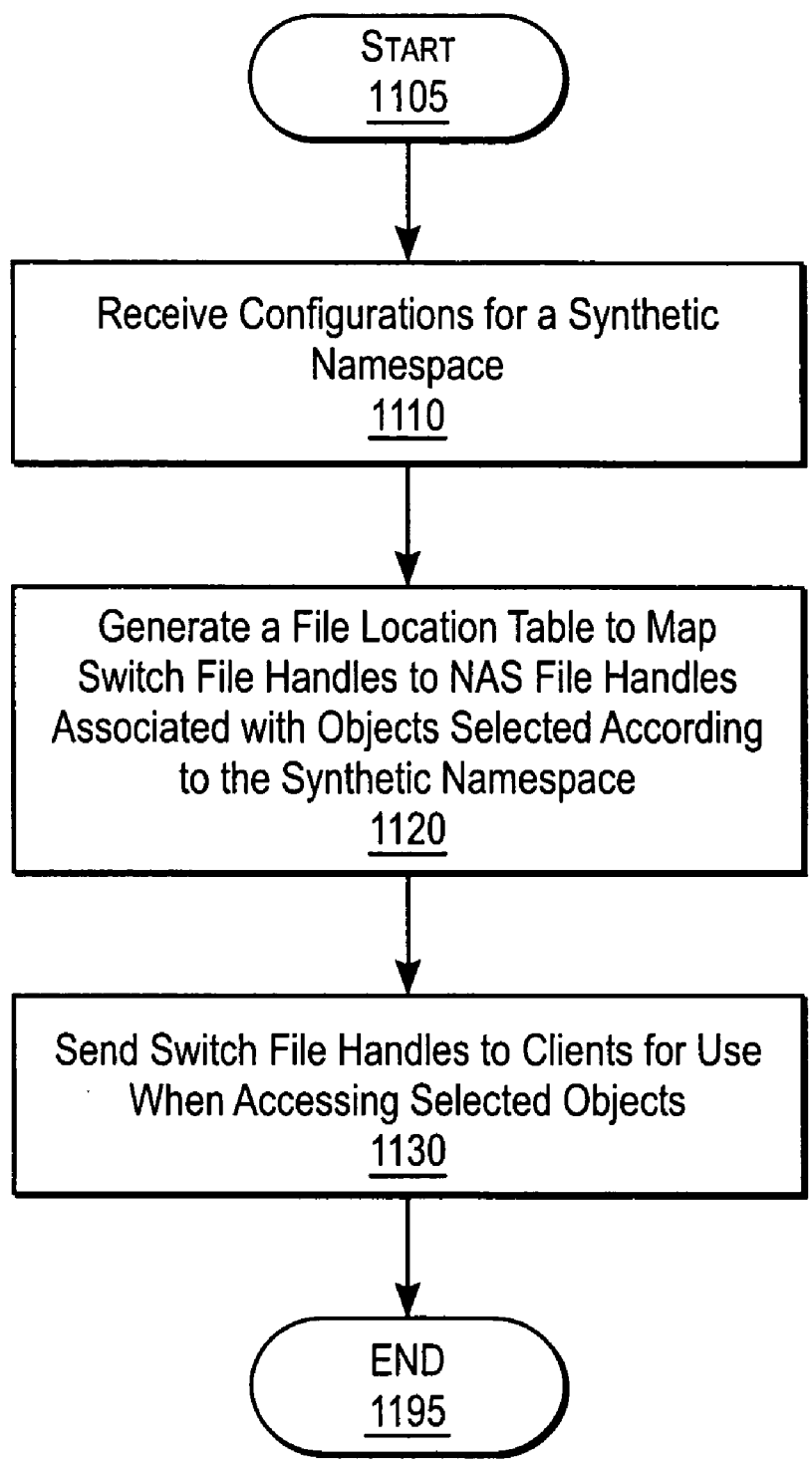
FIG. 11 is a flow chart illustrating a method of customizing a namespace with a synthetic namespace according to one embodiment of the present invention.

FIG. 11 is a flow chart illustrating a method 1100 of customizing namespaces according to one embodiment of the present invention. The NAS switch 110 receives 1110 configurations for a synthetic namespace from, for example, a network administrator or a user. The configurations can designate objects according to a user, a group of users, the client 140, a location, a document-type, etc. For example, Table 4 shows an exemplary file location table for users accessing /usr/local/bin from Boston while Table 5 shows an exemplary file location table for users accessing /usr/local/bin from London. To NAS switch 110, it /usr/local/bin appears to have migrated to different locations, depending on whether a user is in Boston or London. In one embodiment, the synthetic namespace can be configured from a union directory. The union directory results from a union of the contents of two or more member directories.

TABLE 4

| Source File Server | Origin Physical Share Export | Origin Path | Destination File Server | Destination Physical Share Export | Destination Path |
|---|---|---|---|---|---|
| X | /global | /usr/local/bin | London | /global | /usr/local/bin |

TABLE 5

| Source File Server | Origin Physical Share Export | Origin Path | Destination File Server | Destination Physical Share Export | Destination Path |
|---|---|---|---|---|---|
| X | /global | /usr/local/bin | Boston | /global | /usr/local/bin |

In response to the configurations, the file server module 112 generates 1120 a file location table to map switch file handles to file handles associated with selected objects. The objects can be independent of a physical share from which the object is stored. A back-end process can periodically verify that the mappings are valid, and update mappings responsive to, for example, migrated or replicated objects. The file location tables can also be updated automatically by the NAS switch 110 during migration or replication process, along with the file handle migration tables. The switch file handles are sent 1330 to the clients for use when accessing the selected objects.

Figure 12:
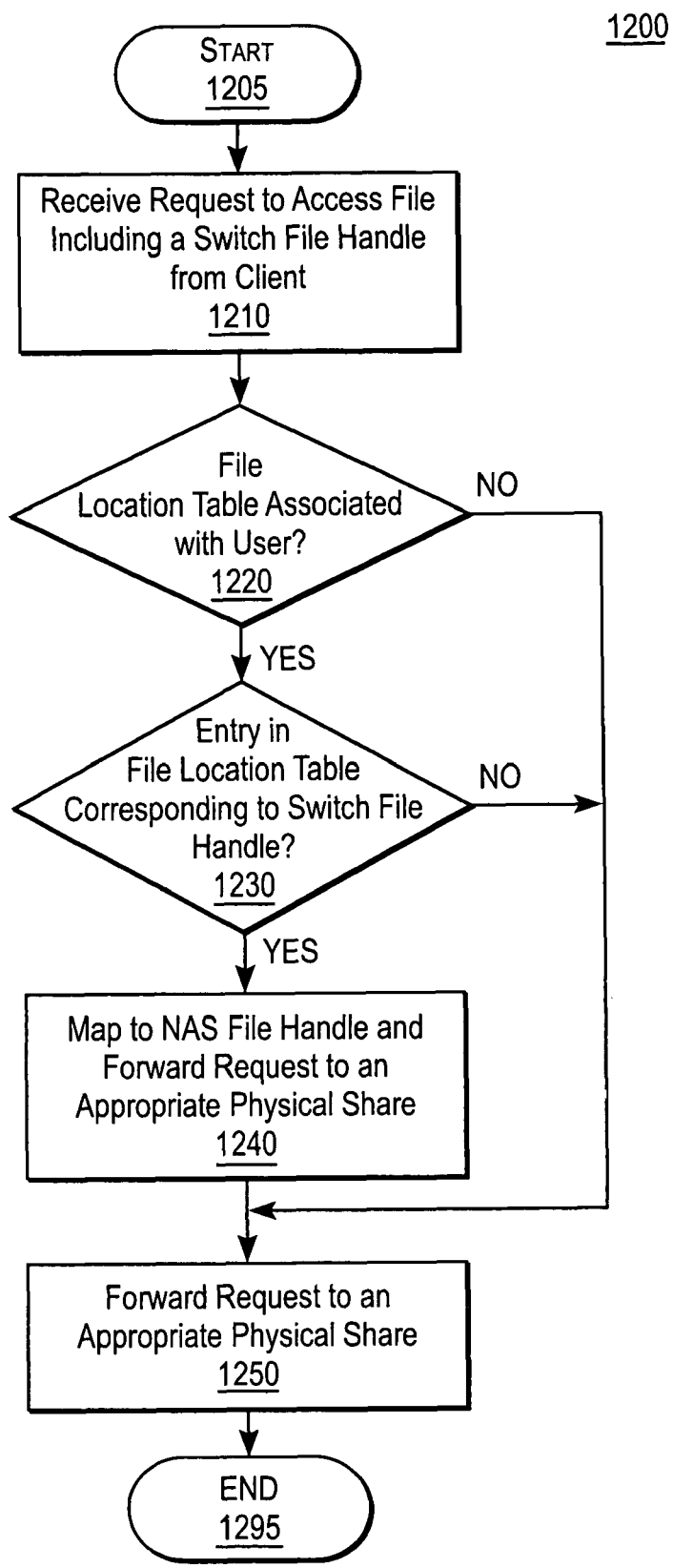
FIG. 12 is a flow chart illustrating a flow chart for retrieving objects from within the customized namespace according to one embodiment of the present invention.

FIG. 12 is a flow chart illustrating a method 1200 of retrieving an object from a customized namespace according to one embodiment of the present invention. The NAS switch 110 receives 1210 a switch file handle from the client module 140. The NAS switch 110 determines whether a user submitting the request has an associated file location table 1220. If so, the file location table is checked 1230 for an entry corresponding to the NAS file handle. If an entry is found, the NAS switch 110 maps 1240 to a NAS file handle and forwards the request to the physical share or file server storing the object, as indicated in the file location table. On the other hand, if the user does not have a customized namespace, or if there is no entry for the switch file handle, the request is forwarded 1250 to an appropriate physical share.

In one embodiment, the file handle migration table is checked, as described above, in addition to checking the file location tables.

Figure 13:
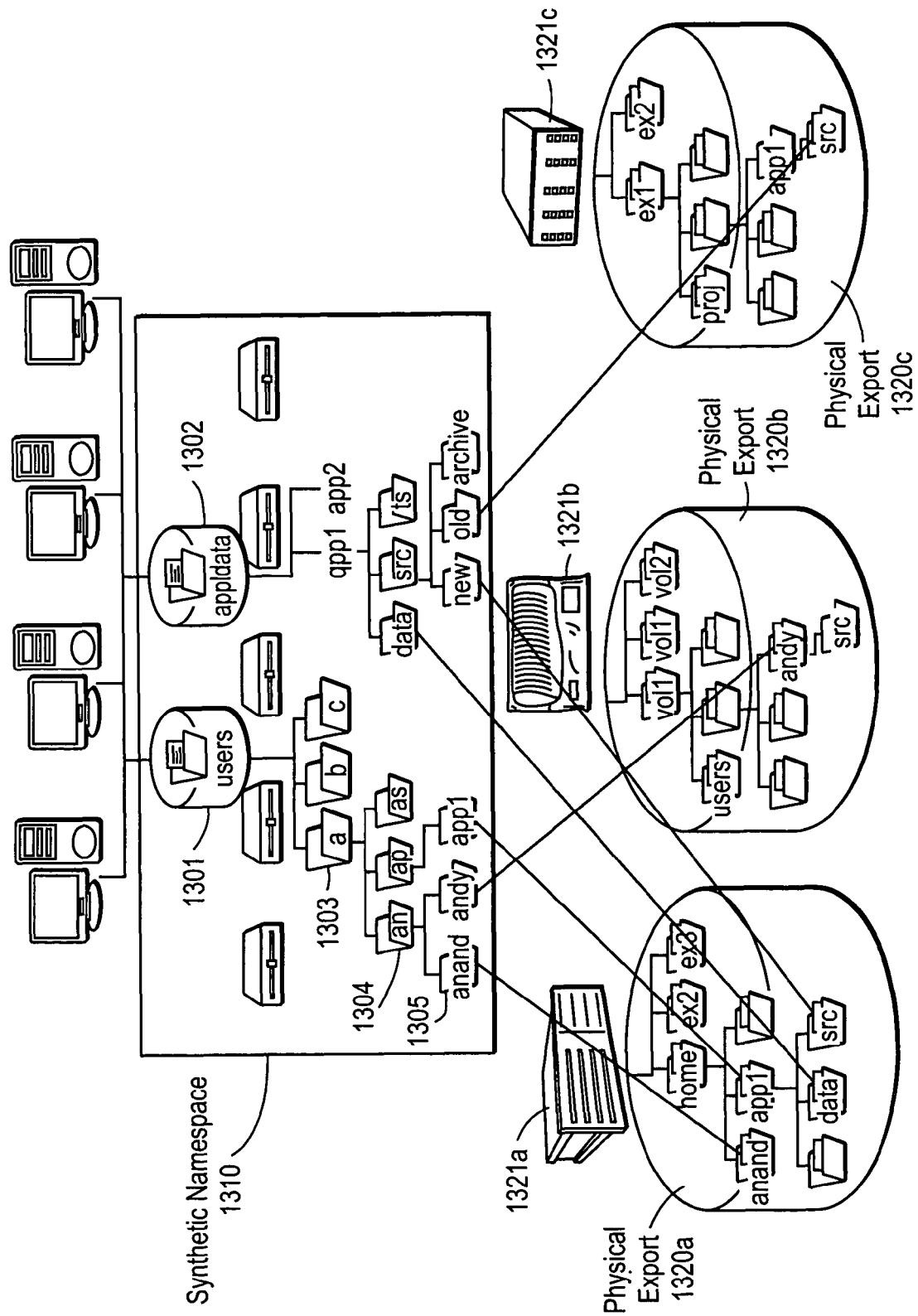
FIG. 13 is a schematic diagram illustrating a synthetic namespace mapped to physical shares within a unified namespace according to one embodiment of the present invention.

FIG. 13 is a schematic diagram illustrating mapping between a synthetic namespace 1310 and physical shares 1320*a-c* within a unified namespace 1330. The physical shares 120*a-c* each have an associated namespace tied to, for example, a particular file server. The unified namespace 1330 combines the physical shares 120*a-c* as a single namespace, providing transparency to the back-end system.

The synthetic namespace 1310 is organized to present a 'users' directory 1301 and a 'appldata' directory 1302. The 'users' directory 1301 is further segregated by first letters of a name (i.e., a, b, c, etc.). An 'a' directory 1303 is further segregated to an 'an' directory 1304 which contains an 'anand' directory 1305 that is associated with a user named Anand. As shown, the 'anand' directory 1305 is stored on the physical share 1320*a* whereas an 'andy' directory 1306 is stored on the physical share 1320*b*. Each physical share 1320*a,b,c* can be stored on a separate device 1321*a,b,c*, respectively.

The accompanying description is for the purpose of providing a thorough explanation with numerous specific details. Of course, the field of storage networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. For example, although the present invention is described with reference to storage networks operating under the NAS protocol, it can similarly be embodied in future protocols for decentralized storage networks other than NAS, or in mixed protocol networks. Accordingly, the present invention should not be understood as being limited to the specific implementations described below, but only by the claims that follow.

The processes, features, or functions of the present invention can be implemented by program instructions that execute in an appropriate computing device. Example computing devices include enterprise servers, application servers, workstations, personal computers, network computers, network appliances, personal digital assistants, game consoles, televisions, set-top boxes, premises automation equipment, point-of-sale terminals, automobiles, and personal communications devices. The program instructions can be distributed on a computer readable medium, storage volume, or the Internet. Program instructions can be in any appropriate form, such as source code, object code, or scripts.

We claim:

1. A computer-implemented method for customizing a namespace in a storage network, comprising:
    receiving one or more NAS (Network Attached Storage) file handles or path names from one or more exported physical file shares, the NAS file handles or path names each indicative of a location of an object on an exported physical file share;
    receiving a plurality of configurations for creating a synthetic namespace from a network administrator or user, the plurality of configurations specifying an organization of, and criteria for selecting objects to be included in, the synthetic namespace;
    maintaining a file location table for a plurality of selected objects that are selected according to the received plurality of configurations for the synthetic namespace, the file location table comprising mappings between each selected object's NAS file handle or path name and a corresponding switch file handle that remains independent of any location changes for the selected object, wherein the synthetic namespace comprises a subset of the objects on the one or more exported physical file shares; and
    providing the switch file handles (or file handle) to a client, so that the selected objects are accessible by the client via the provided switch file handles, wherein providing the switch file handles (or file handle) to the client is associated with presenting to the client a customized namespace, the customized namespace comprising the synthetic namespace of the selected objects.

2. The method of claim 1, further comprising:
    maintaining a second file location table configured in accordance with a second synthetic namespace of selected objects that are available to a second one or more clients.

3. The method of claim 1, wherein the synthetic namespace includes objects drawn from two or more of the exported physical file shares.

4. The method of claim 1, wherein maintaining the file location table comprises confirming the mappings of the switch file handles to the NAS file handles or path names at predetermined intervals to verify that the mappings are valid and/or to update the mappings in response to migration or replication of objects.

5. The method of claim 1, further comprising:
    receiving a request having a received switch file handle from a client to access an object;
    identifying a file location table based on the request; and
    in the identified file location table, identifying a NAS file handle or a path name that is associated with the received switch file handle.

6. The method of claim 5, further comprising:
    forwarding the request to the object location associated with the identified NAS file handle or path name.

7. The method of claim 6, wherein identifying a file location table is based on an exported physical file share or a user associated with the request.

8. The method of claim 1, wherein the synthetic namespace is organized based on one or more of a user, a group of users, a client, a location of a user, a document-type, a permission level, a date, a time, or a department, associated with selected objects.

9. A computer-implemented method for customizing a namespace in a storage network, comprising:
    receiving one or more location-based pointers from one or more exported physical file shares, the one or more location-based pointers including locations of objects on the one or more exported physical file shares;
    maintaining one or more file handle migration tables that map switch file handles to the one or more location based pointers, the switch file handles being independent of any changes in object locations, and a portion of entries in the one or more file handle migration tables configured in accordance with a synthetic namespace of selected objects that are available to one or more clients, the synthetic namespace comprising a subset of the objects on the one or more exported physical file shares,
    wherein a portion of entries in the one or more file handle migration tables is configured to track objects that change locations, such that at least some entries in the one or more file handle migration tables are updated during a migration or replication process; and
    providing a switch file handle to the one or more clients, the switch file handle designating the file location table or one or more of the objects,
    wherein the switch file handle is used by one of the one or more clients to access one or more of the objects, and wherein providing the switch file handle to the one or more clients is associated with presenting to the one or more clients a customized namespace, the customized namespace comprising the synthetic namespace of the selected objects.

10. An apparatus, comprising:
    memory; and
    one or more processors, the one or more processors configured to:
    receive one or more NAS (Network Attached Storage) file handles or path names from one or more exported physical file shares, the NAS file handles or path names each indicative of a location of an object on an exported physical file share of a NAS file server;
    receive a plurality of configurations for creating a synthetic namespace from a network administrator or user, the plurality of configurations specifying an organization of, and criteria for selecting objects to be included in, the synthetic namespace;
    maintain a file location table for a plurality of selected objects that are selected according to the received plurality of configurations for the synthetic namespace, the file location table comprising mappings between each selected object's NAS file handle or path name and a corresponding switch file handle that remains independent of any location changes for the selected object, wherein the synthetic namespace comprises a subset of the objects on the one or more exported physical file shares; and provide the switch file handles (or file handle) to a client, so that the selected objects are accessible by the client via the provided switch file handles, wherein providing the switch file handles (or file handle) to the client is associated with presenting to the client a customized namespace, the customized namespace comprising the synthetic namespace of the selected objects.

11. The apparatus of claim 10, wherein the processor is further operable to maintain a second file location table configured in accordance with a second synthetic namespace of selected objects that are available to a second one or more clients.

12. The apparatus of claim 10, wherein the synthetic namespace includes objects drawn from two or more of the exported physical file shares.

13. The apparatus of claim 10, wherein maintaining the file location table comprises confirming the mappings of the switch file handles to the NAS file handles or path names at predetermined intervals to verify that the mappings are valid and/or to update the mappings in response to migration or replication of objects.

14. The apparatus of claim 10, wherein the processor is further operable to:
receive a request from a client to access an object;
identify a user associated with the request; and
forward the request to a file location table based on the user.

15. The apparatus of claim 14, wherein the processor is further operable to:
identify a NAS file handle or path name in the file location table that is associated with the switch file handle; and
forward the request to the object location associated with the identified NAS file handle or path name.

16. The apparatus of claim 15, wherein the processor is further operable to:
responsive to not identifying a NAS file handle or path name associated with the request, forward the request to a file location table based on the exported physical file share associated with the request.

17. The apparatus of claim 14, wherein the processor is further operable to:
responsive to not identifying a user associated with the request, forward the request to a file location table based on the exported physical file share associated with the request.

18. A system for customizing a namespace in a storage network, comprising one or more computing devices configured to support:
a file server module to receive NAS (Network Attached Storage) file handles from one or more exported physical file shares, the NAS file handles including locations of objects on the exported physical file shares;
a synthetic namespace module to maintain one or more file location tables that map switch file handles to NAS file handles, the switch file handles being independent of object locations, the one or more file location tables configured in accordance with a synthetic namespace of selected objects that are available to the one or more clients, wherein the synthetic namespace is configured by a network administrator or user using a plurality of configurations, the plurality of configurations specifying an organization of, and criteria for selecting objects to be included in, the synthetic namespace, wherein the synthetic namespace comprises a subset of the objects on the one or more exported physical file shares; and
a client server module, coupled in communication with the file server module and the synthetic namespace module, the client server module configured to provide a switch file handle to the one or more clients, the switch file handle designating the file location table or one or more of the selected objects,
wherein the switch file handle is used by one of the one or more clients to access one or more of the selected objects, and wherein providing the switch file handle to the one or more clients is associated with presenting to the one or more clients a customized namespace, the customized namespace comprising the synthetic namespace of the selected objects.

19. At least one non-transitory computer readable storage medium comprising memory having computer program instructions stored thereon that are arranged to perform the following operations:
receiving one or more NAS (Network Attached Storage) file handles or path names from one or more exported physical file shares, the NAS file handles or path names each indicative of a location of an object on an exported physical file share of a NAS file server;
receiving a plurality of configurations for creating a synthetic namespace from a network administrator or user, the plurality of configurations specifying an organization of, and criteria for selecting objects to be included in, the synthetic namespace;
maintaining a file location table for a plurality of selected objects that are selected according to the received plurality of configurations for the synthetic namespace, the file location table comprising mappings between each selected object's NAS file handle or path name and a corresponding switch file handle that remains independent of any location changes for the selected object, wherein the synthetic namespace comprises a subset of the objects on the one or more exported physical file shares; and
providing the switch file handles (or file handle) to a client, so that the selected objects are accessible by the client via the provided switch file handles, wherein providing the switch file handles (or file handle) to the client is associated with presenting to the client a customized namespace, the customized namespace comprising the synthetic namespace of the selected objects.

* * * * *